US008811414B2

(12) United States Patent
Nakayama

(10) Patent No.: US 8,811,414 B2
(45) Date of Patent: Aug. 19, 2014

(54) NETWORK SYSTEM

(75) Inventor: Kei Nakayama, Hamamatsu (JP)

(73) Assignee: Yamaha Corporation, Hamamtsu-shi (JP)

( * ) Notice: Subject to any disclaimer, the term of this patent is extended or adjusted under 35 U.S.C. 154(b) by 538 days.

(21) Appl. No.: 12/892,749

(22) Filed: Sep. 28, 2010

(65) Prior Publication Data

US 2011/0075856 A1    Mar. 31, 2011

(30) Foreign Application Priority Data

Sep. 28, 2009    (JP) .................. 2009-222169

(51) Int. Cl.
*H04L 12/28* (2006.01)
*H04L 12/56* (2006.01)
*H04J 3/26* (2006.01)

(52) U.S. Cl.
USPC ........................... 370/401; 370/390; 370/432

(58) Field of Classification Search
USPC ................................. 370/403, 401
See application file for complete search history.

(56) References Cited

U.S. PATENT DOCUMENTS 4,481,574 A * 11/1984 DeFino et al. ............. 379/93.01
5,515,296 A * 5/1996 Agarwal ...................... 709/204
2007/0223498 A1   9/2007 Nakayama
2008/0034024 A1 * 2/2008 Savell et al. .................. 708/313
2008/0170857 A1 * 7/2008 Bardalai ......................... 398/59
2008/0232380 A1 * 9/2008 Nakayama .................... 370/400
2008/0294276 A1  11/2008 Nakayama
2009/0100143 A1   4/2009 Nakayama

FOREIGN PATENT DOCUMENTS

| JP | 2007-258966 | 10/2007 |
| JP | 2007-259347 A | 10/2007 |
| JP | 2008-099264 | 4/2008 |
| JP | 2009-094589 | 4/2009 |

* cited by examiner

*Primary Examiner* — Faruk Hamza
*Assistant Examiner* — Abu-Sayeed Haque
(74) *Attorney, Agent, or Firm* — Morrison & Foerster LLP

(57) ABSTRACT

An IO3 that is a connecting node reads waveform data from respective regions, in a TL frame circulated in a first sub-network system, corresponding to transmission channels allocated to any node belonging to the first sub-network system and writes the read waveform data into the regions, in a TL frame circulated in a second sub-network system, corresponding to the same transmission channels, and reads waveform data from regions, in the TL frame circulated in the second sub-network system, corresponding to the transmission channels allocated to any node constituting the second sub-network system and writes the read waveform data into the regions, in the TL frame circulated in the first sub-network system, corresponding to the same transmission channels.

8 Claims, 14 Drawing Sheets

F I G. 6
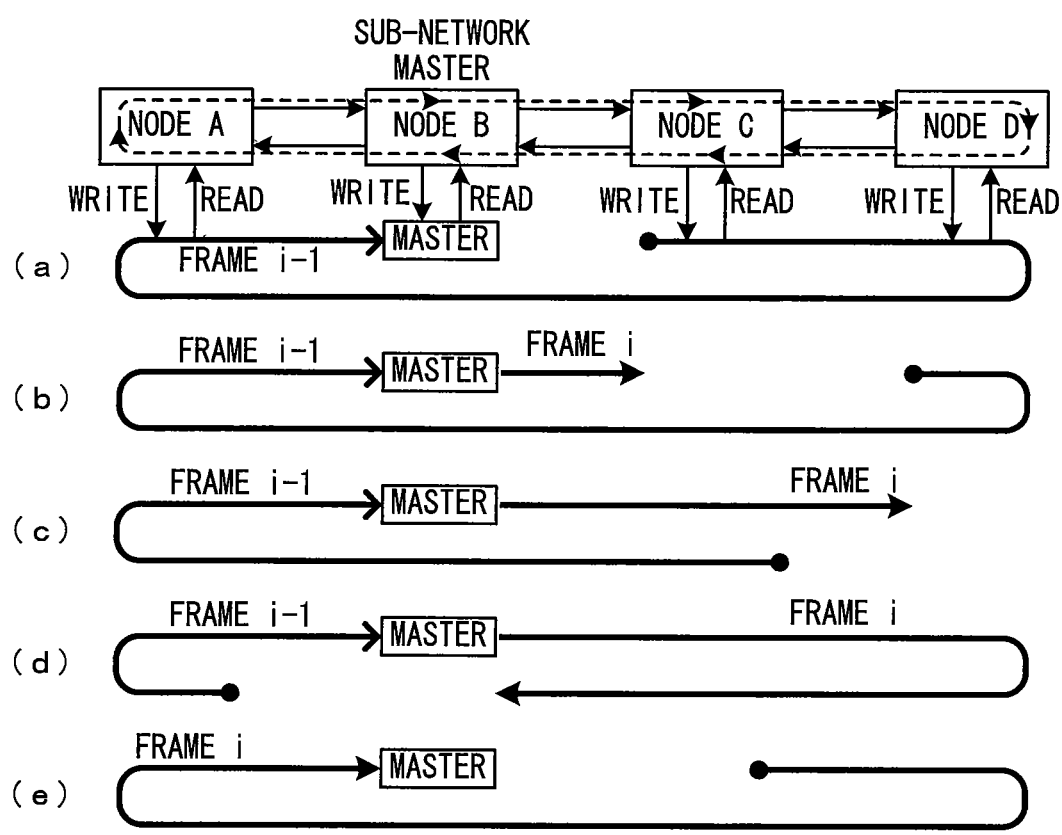

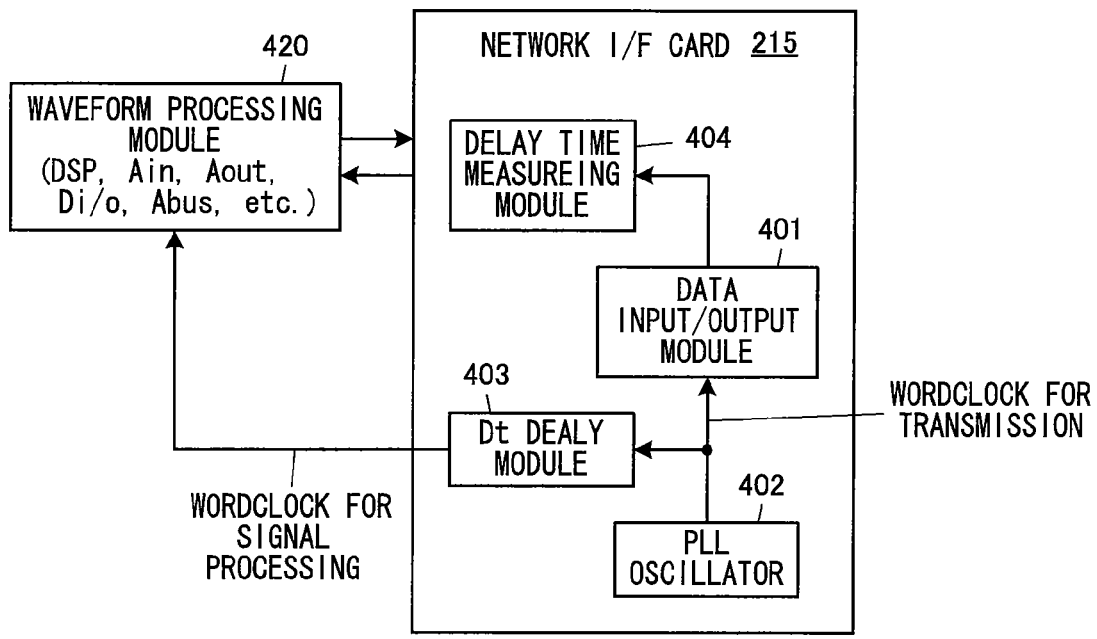
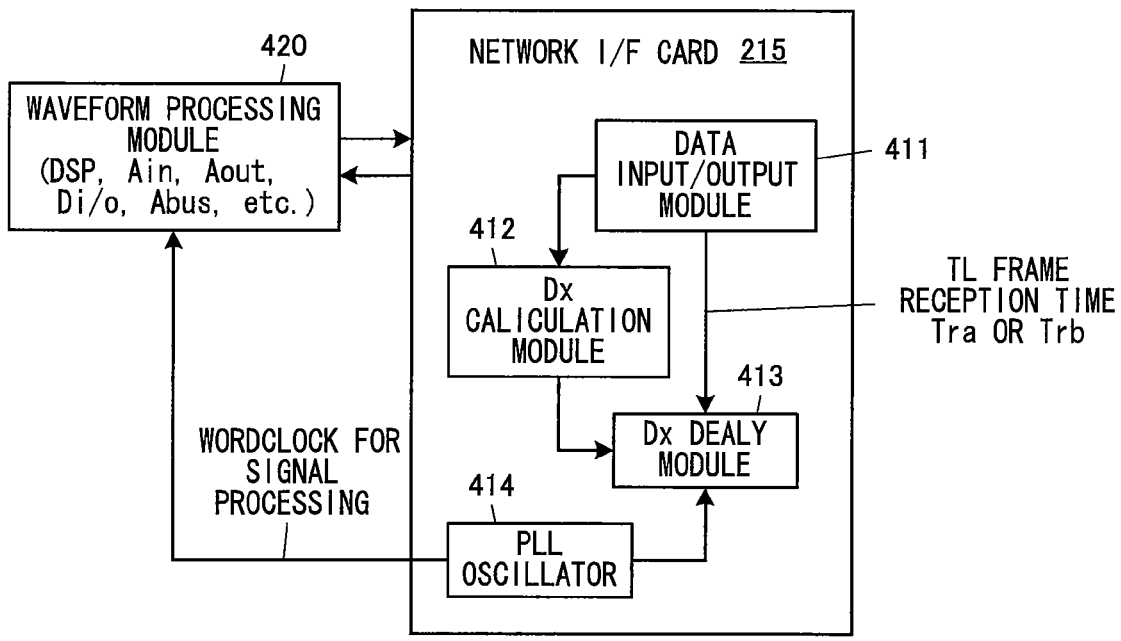

NETWORK SYSTEM

BACKGROUND OF THE INVENTION

1. Field of the Invention

The invention relates to a network system for transporting audio signals among a plurality of nodes.

2. Description of the Related Art

Recently, proposed network systems configured to be able to transport audio signals in real time among a plurality of devices include, for example, those described in the following Documents 1 to 3.

In the network systems described in the Documents 1 to 3, a frame is periodically circulated along a ring transmission route formed by processors constituting the system and each of the processors reads necessary data from the frame and writes necessary data into the frame, whereby not only the audio signals but also control signals such as the Ethernet (registered trademark) frame and the like can be stably transported from any processor to any processor both of which constitute the system. The processors are connected to form a loop and then operate in a suitable mode, whereby when a communication failure occurs at one location in the network, the network can continue the transport of the audio signals and the control signals in a substantially similar manner to that before the occurrence of the communication failure and provide stable data transport in this point of view.

Aside from these systems, the network system as described in the Document 4 is also proposed.

The network system described in the Document 4 is configured such that a plurality of sub-networks are connected to one another via a connecting network to enable routings of signals from a processor belonging to one sub-network to a processor belonging to another sub-network. The routing enables the processor belonging to the one sub-network to utilize the function of the processor belonging to the another sub-network, so that even when the number of processors connectable to the one sub-network is limited depending on the maximum number of transmission channels for the audio signals determined from the standard of the network, each processor can utilize the functions of the processors exceeding the limit in the maximum number of transmission channels.

Document 1: Japanese Patent Laid-open Publication No. 2009-94589

Document 2: Japanese Patent Laid-open Publication No. 2008-99264

Document 3: Japanese Patent Laid-open Publication No. 2007-259347

Document 4: Japanese Patent Laid-open Publication No. 2007-258966

SUMMARY OF THE INVENTION

Incidentally, in the network systems described in the above-described Documents 1 to 3, it is necessary to circulate a frame for signal transmission along the transmission route in a predetermined period while each of the processors reads data from the frame and writes data into the frame.

Accordingly, those network systems have a problem of limits in the number of processors which can be installed in the system and in the physical length of the transmission route (depending mainly on the length of the cable connecting the processors).

Further, there is a demand to keep the reliability in communication even in the case where the transmission route is elongated or the number of connected processors is increased to accordingly increase the probability of occurrence of failure.

The Document 4 discloses the technique for substantially increasing the number of processors connectable to the network. Even if the technique is applied to the network system of the type of periodically circulating the frame along the ring transmission route as described in the Document 1, the technique does not contribute to the object to improve the limit in the length of the transmission route and the reliability of communication.

The invention has been made under the above-described background, and an object thereof is to realize a network system capable of transporting audio signals with good reliability among many processors arranged in a wide area.

In order to achieve the above-described object, network system of the invention is a network system wherein a first network system and a second network system are connected by a connecting node which belongs to both of the first and second network systems, each of the first and second network systems being a network system in which a plurality of nodes and the connecting node are connected one another to form a cascade or a loop and form a ring transmission route running through all of the plurality of nodes, a frame including regions of a plurality of transmission channels is circulated along the ring transmission route, and each node transmits audio data and control data to other nodes in the network system by writing the audio data and control data into the frame or receives audio data and control data from other nodes in the network system by reading the audio data and control data from the frame, wherein a first node in the first network system, other than the connecting node, works as a master node, which periodically generates and sends a first frame to the ring transmission route in the first network system, the connecting node periodically generates and sends a second frame to the ring transmission route in the second network system with a same period as receiving the first frame generated by the first node, a second node in the network system exclusively allocates, to the nodes in the network system, one or more transmission channels among the plurality of transmission channels, which are commonly used in both of the first frame and the second frame, each node in the first network system and in the second network system respectively writes audio data to be sent to another node into each of the regions, in the frame received by the node, of the transmission channels allocated to the node, and the connecting node, based on the allocation of the transmission channel by the second node, a) reads audio data from respective regions, in the first frame, of the transmission channels allocated to any node in the first network system and writes the read audio data into the corresponding regions, in the second frame of the same transmission channels, and b) reads audio data from respective regions, in the second frame, of the transmission channels allocated to any node in the second network system and writes the read audio data into the corresponding regions, in the first frame, of the same transmission channels.

Another network system of the invention is a network system wherein a first network system and a second network system are connected by a connecting node which belongs to both of the first and second network systems, each of the first and second network system being a network systems in which a plurality of nodes and the connecting node are connected one another to form a cascade or a loop and form a ring transmission route running through all of the plurality of nodes, a frame including regions of a plurality of transmission channels is circulated along the ring transmission route, and each node transmits audio data and control data to other nodes in the network system by writing the audio data and control data into the frame or receives audio data and control data from other nodes in the network system by reading the audio data and control data from the frame, wherein the connecting node works as a master node, which periodically generates and sends a first frame to the ring transmission route in the first network system, and generates and sends a second frame to the ring transmission route in the second network system with a same period as sending the first frame, one node in the network system exclusively allocates, to the nodes in the network system, one or more transmission channels among the plurality of transmission channels, which are commonly used in both of the first frame and the second frame, each node in the first network system and in the second network system respectively writes audio data to be sent to another node into each of the regions, in the frame received by the node, of the transmission channels allocated to the node, and the connecting node, based on the allocation of the transmission channel by one node, a) reads audio data from respective regions, in the first frame, of the transmission channels allocated to any node in the first network system and writes the read audio data into the corresponding regions, in the second frame of the same transmission channels, and b) reads audio data from respective regions, in the second frame, of the transmission channels allocated to any node in the second network system and writes the read audio data into the corresponding regions, in the first frame, of the same transmission channels.

In the above network systems, it is conceivable that each node in one of the first network system and the second network system delays, among audio data which the node reads from the frame received by the node, first audio data which is written into the frame of the one of the first network system and the second network system by a node in the one of the first network system and the second network system for a longer time than second audio data which is written into the frame of the other of the first network system and the second network system by a node in the other of the first network system and the second network system and read from the frame of the other of the first network system and the second network system by the connecting node and written into the frame of the one of the first network system and the second network system by the connecting node, by a time required for the connecting node to bridge the second audio data from the frame of the other of the first network system and the second network system to the frame of the one of the first network system and the second network system.

The above and other objects, features and advantages of the invention will be apparent from the following detailed description which is to be read in conjunction with the accompanying drawings.

BRIEF DESCRIPTION OF THE DRAWINGS

FIG. 6 is an illustration for explaining the transport statuses of the TL frame during transport of audio signals on the sub-network system;

FIG. 17 is a diagram showing the configuration of a wordclock generator in the maser node that is not a connecting node;

FIG. 18 is a diagram showing the configuration of the wordclock generator in a slave node that is not the master node and not the connecting node;

DETAILED DESCRIPTION OF THE PREFERRED EMBODIMENTS

Hereinafter, an embodiment to embody the invention will be concretely described based on the drawings.
1. Outline of Audio Network System of Embodiment of the Invention
1.1 Entire Configuration FIG. 1 shows the schematic configuration of an audio network system that is an embodiment of a network system of the invention.

Figure 1:
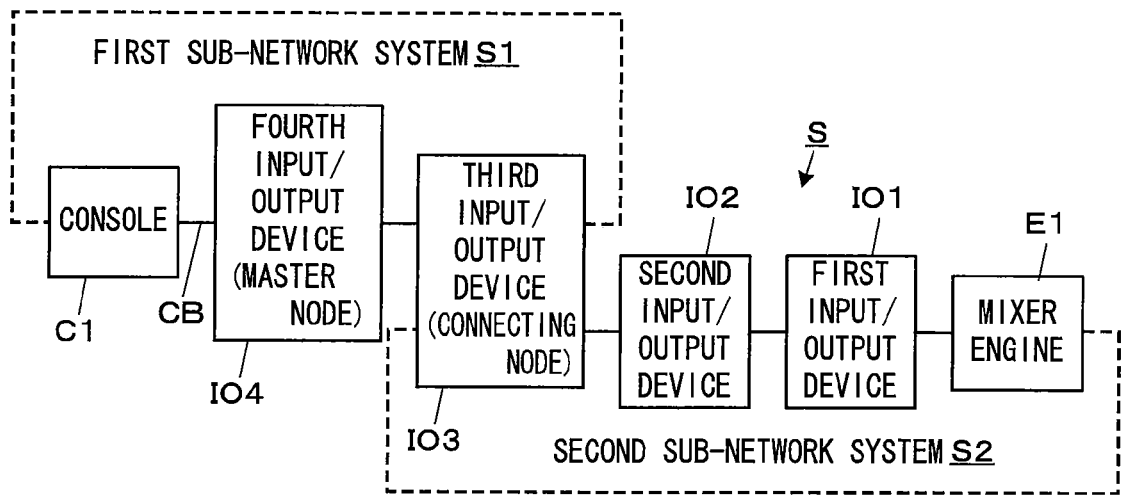
FIG. 1 is a diagram showing the schematic configuration of an audio network system that is an embodiment of a network system of the invention.

As shown in FIG. 1, the audio network system S is configured such that a first sub-network system S1 and a second sub-network system S2 are connected by a third input/output device (processor) 103 that is a connecting node.

The first sub-network system S1 includes a console C1, a fourth input/output device IO4, and the third input/output device IO3 which are connected to form a cascade via a communication cable CB indicated by a solid line or a loop including a cable indicated by a broken line.

The second sub-network system S2 includes the third input/output device IO3, a second input/output device IO2, a first input/output device IO1 and a mixer engine E1 which are similarly connected to form a cascade or a loop.

The third input/output device IO3 separately has a network I/F (interface) for connecting to the first sub-network system S1 and a network I/F for connecting to the second sub-network system S2. In each of the sub-network systems, the third input/output device IO3 can transmit and receive, as a node belonging to that sub-network system, data to/from other nodes belonging to that sub-network system. The third input/output device IO3 can also transmit data which has been inputted to one of the sub-network systems, to the other sub-network system. Thus, the third input/output device IO3 can work as a connecting node connecting the two sub-network systems.

The first to fourth input/output devices IO1 to IO4 each have an input module inputting audio signals from the outside into the audio network system S and/or an output module outputting audio signals to the outside. For performing analog input/output, the first to fourth input/output devices IO1 to IO4 each include an A/D converter and a D/A converter and perform conversion between digital audio signals handled in the audio network system S and analog audio signals inputted/outputted through its terminals. The number of input channels (input ports) and output channels (output ports), or other functions provided in the input/output device may be different device by device.

The console C1 is a device for accepting operations to devices constituting the audio network system S, and has a console panel including many controls and a display device.

The mixer engine E1 is a device performing various kinds of signal processing such as mixing, equalizing, effect addition and the like on audio signals in a plurality of channels inputted from each input/output device and transported through the audio network system S. The result of the signal processing can be transported to each input/output device via the audio network system S and outputted from the input/output device to the outside.

In the audio network system S, the fourth input/output device IO4 is a wordclock supply source determining the transport timing of a frame in the whole system and a master node performing management operation of the whole system including allocation of transmission channels as will be described later.

1.2 Configuration of Sub-Network System

Figure 2A:
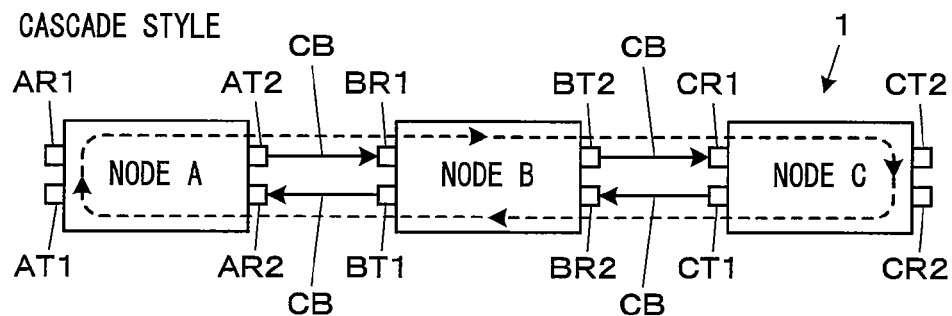
FIG. 2A and FIG. 2B are diagrams showing the schematic configurations of a sub-network system of the audio network system shown in FIG. 1.
Figure 2B:
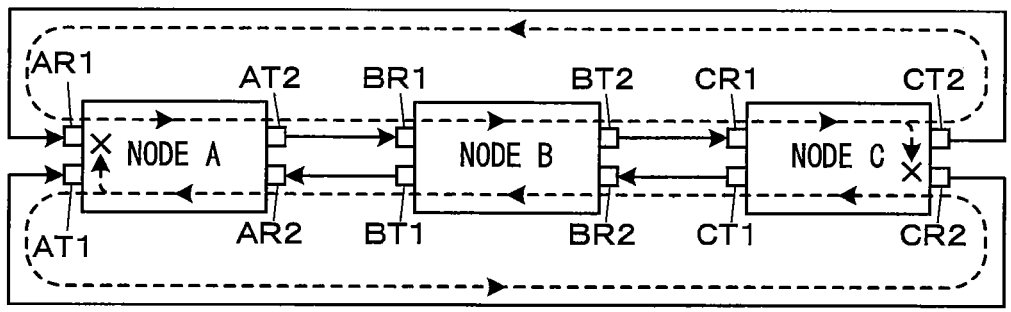

Next, FIG. 2A and FIG. 2B show the schematic configurations of a sub-network system.

As shown in FIG. 2A and FIG. 2B, the sub-network system 1 is constructed by connecting nodes by communication cables CB in sequence, each of the nodes including two sets of reception interfaces (I/Fs) being receivers and transmission I/Fs being transmitters each of which performs communication in a singe direction. These nodes correspond to the console C1, the input/output devices IO1 to IO4 and the mixer engine E1 in FIG. 1. Although an example composed of three nodes A to C is shown, any number of nodes more than one may be employed.

In the node A, a reception I/F AR1 and a transmission I/F AT1 are one set of I/Fs, and a reception I/F AR2 and a transmission I/F AT2 are another set of I/Fs. For the nodes B and C, the same relation also applies to I/Fs with a first character of symbol "B" or "C" in place of "A."

The connection between the nodes is established by connecting one set of reception I/F and transmission I/F to one set of transmission I/F and reception I/F of another node via the communication cables CB, respectively. For example, between the node A and the node B, the reception I/F AR2 is connected with the transmission I/F BT1, and the transmission I/F AT2 is connected with the reception I/F BR1. Further, between the node B and the node C, another set of I/Fs in the node B are connected with one set of I/Fs in the node C.

The state in which the nodes are connected as one line having ends as shown in FIG. 2A shall be called "cascade style". In this case, the cables CB connecting between the nodes can be used to form one ring data transmission route as shown by a broken line, so that each node can perform transmission and reception of data to/from any node on the transmission route by transmitting a frame over the transmission route in a manner to circulate it in a constant period, and reading and writing necessary information from/into the frame.

In the sub-network system 1, one node becomes a master node (the master in a unit of sub-network system shall be called a "sub-network master" distinguished from the master node in the whole system), which generates a frame for transporting audio signals, periodically circulates the frame over the transmission route, and manages the sub-network system. The frame generated by the sub-network master shall be called a "TL (Transporting Lorry) frame."

Accordingly, a sub-network conveying audio signals written in the TL frame among a plurality of nodes can be constituted in the sub-network system.

By connecting I/Fs which are not used in the nodes at both ends by using communication cables CB in addition to the cascade shown at FIG. 2A, two ring data transmission routes can be formed as shown in FIG. 2B. Each of the nodes can perform transmission of data to any node on the routes and reception of data from any node on the routes by transporting frames over the routes respectively, and reading and writing necessary information from/into each of the frames. The connection status among the nodes shall be called a "loop style."

In the case where communication is performed at a data amount transportable only by one of the TL frames among two TL frames circulated along the two transmission routes in the loop style, even if a break of wire occurs at one location, the transport of the TL frame is looped back at both sides of the break location, whereby the sub-network system can be immediately reconstructed into the system in the cascade as shown in FIG. 2A with both sides of the break location regarded as both ends of the cascade to continue the transport of the TL frame with a loss of zero to two frames at most (see Japanese Patent Laid-open Publication No. 2007-259347).

Further, although two cables are shown in FIG. 2A and FIG. 2B, one cable which is made by bundling the two cables together can also be used to establish connection between one set of I/Fs, as long as the reception I/F and transmission I/F in one set are adjacently or integrally provided.

As in the third input/output device IO3 in FIG. 1, the device connected to two or more sub-network systems has two sets of transmission/reception I/Fs for every sub-network system connected therewith, used in the connected sub-network system. Therefore, the third input/output device IO3 has four sets of transmission/reception I/Fs.

Further, when each node is provided with a necessary I/F, an external device can be connected thereto so that the node can write data received from the external device into the TL frame and transmit the TL frame to another node and transmit the data read out from the TL frame to the external device.

As such an external device, for example, an external console is conceivable. It is also conceivable that the console transmits a command in accordance with an operation accepted from a user, to a node connected thereto, thereby instructing such an operation that the node writes the command into the TL frame and transmits it to another node, or the node connected to the console reads out a response, level data or the like which has been written into the TL frame and transmitted by the another node, and transmits it to the console, so as to use it for display of the state of a control or level display in the console.

1.3 Configuration of TL Frame

Figure 3:
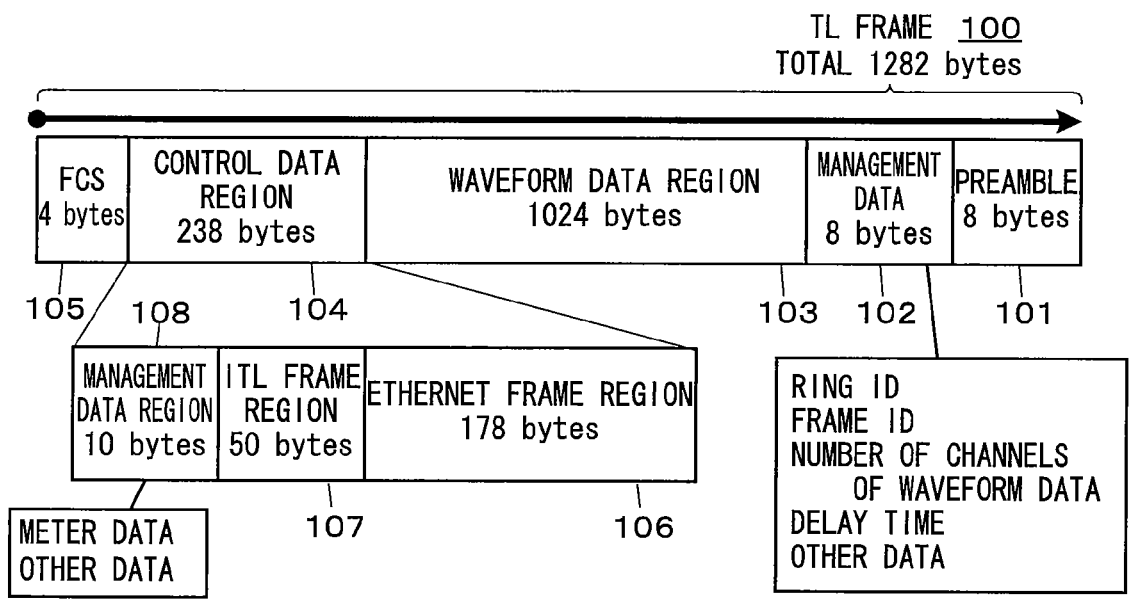
FIG. 3 is an illustration showing a configuration example of a TL frame transported along transmission routes in the sub-network system shown in FIG. 2A and FIG. 2B.
Figure 4:
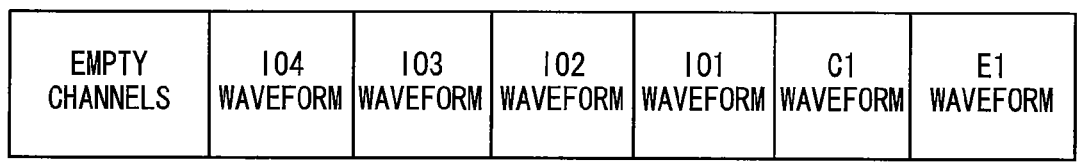
FIG. 4 is an illustration showing more detailed configurations of a waveform data region of the TL frame shown in FIG. 3.

Next, a configuration example of the TL frame that is transported through the above-described transmission routes in the sub-network system is shown in FIG. 3. FIG. 4 shows more detailed configurations of a waveform data region of the TL frame. Note that the widths of the regions shown in these drawings do not necessarily correspond to data sizes.

As shown in FIG. 3, the TL frame 100 has a size of 1282 bytes, and is composed of regions such as a preamble 101, management data 102, waveform data (audio data) region 103, control data region 104, and FCS (Frame Check Sequence) 105 in sequence from the head. The size of each region is fixed irrespective of the data amount to be written in the region. Further, the sizes of the regions other than the FCS 105 shown here are just examples and may be changed as required.

The preamble 101 is data of 8 bytes in total, in which preamble defined by IEEE (Institute of Electrical and Electronic Engineers) 802.3 and SFD (Start Frame Delimiter) are written.

The management data 102 is data of 8 bytes, in which a ring ID indicating the transmission route in the sub-network system through which the frame circulates, a frame ID that is a frame serial number, the number of channels of the waveform data in the waveform data region 103, a delay time used for synchronization of wordclock and so on are written as the data to be used in management of data written in the TL frame by each of the nodes in the sub-network system.

As the waveform data region 103, 1024 bytes are secured, and waveform data of 32 bits for 1 sample can be written for 256 channels as data of audio signals. In other words, in this system, the audio signals corresponding to the 256 channels can be transmitted by circulating one TL frame 100. Note that it is not necessary to concern about what is written in regions of channels not in use for transmission (empty channels) in the 256 channels. Note that, the size of the regions for each channel may be changed depending on the number of bits of the waveform data. In this case, the 16-bit waveform data of 512 channels can be transmitted, and the 24-bit waveform data of 340 channels can be transmitted.

As shown in FIG. 4, channels in the waveform data region 103 are allocated in advance to the nodes constituting the audio network system S, and each of the nodes writes output waveform data at positions of the channels that have been allocated to the node.

The allocation here is performed not in each sub-network system but commonly and exclusively in the whole audio network system S. More specifically, allocations are common to the TL frame circulated in the first sub-network system S1 and the TL frame circulated in the second sub-network system S2, and a channel allocated in one node in the first or second sub-network system is not allocated to any other nodes in either of the first and second sub-network systems S1, S2. Further, no channel is allocated to the node that does not write audio signals but only reads audio signals in some case.

This allocation is performed by the master node which performs the management operation of the whole system based on the request from each node.

On the other hand, as the control data region 104, 238 bytes are prepared, in which an Ethernet frame region 106, an ITL frame region 107, and a management data region 108 are provided.

In the Ethernet frame region 106 among the regions, a frame in the IEEE (Institute of Electrical and Electronic Engineers) 802.3 format (an Ethernet frame) that is obtained by framing the IP packet for inter-node communication based on the IP (Internet Protocol) is written.

If the Ethernet frame to be written exceeds the prepared size (178 bytes, here), the Ethernet frame is divided into a necessary number of blocks on the transmission side device, and each of the blocks is written into one TL frame. Then the above described necessary number of TL frames are transported to the destination, and the destination device reads out respective blocks from the respective TL frames 100 and combines the blocks together to restore the Ethernet frame before division, whereby the Ethernet frame can be transported between the nodes in a similar manner to the regular transport based on the Ethernet (registered trademark).

In the ITL frame region 107, data of an ITL frame to be used for transport of a command and a response to the command between adjacent nodes is written. This ITL frame is used for data transfer when forming the frame transmission route in the system and data transfer after the system is formed though detailed explanation is omitted.

The management data region 108 is a region into which data that is used for management of data contained in the TL frame 100 by each of the nodes in the sub-network system is written. The data to be written into the management data region 108 include, for example, level data of audio signals that is used for displaying a level, a break detection flag indicating that the TL frame 100 has been broken during transport, an error flag indicating that an error has occurred during transport of the TL frame 100, and so on.

The FCS 105 is a field for detecting an error of the frame, defined by IEEE 802.3.

1.4 Method of Transmitting TL Frame

Figure 5:
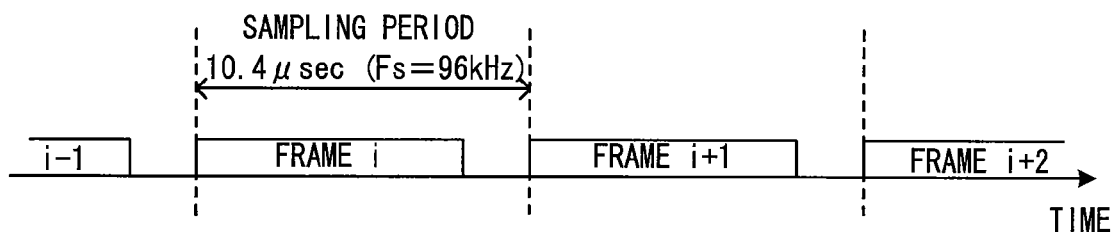
FIG. 5 is a chart showing a transport timing of the TL frame.

Next, a transport timing of the TL frame 100 shown in FIG. 3 is shown in FIG. 5.

As shown in this drawing, in the sub-network system 1, one TL frame 100 is circulated among the nodes every 10.4 μsec (microseconds) that is one period of a sampling period of 96 kHz, and each node writes the audio signals into a desired channel of the TL frame or reads the audio signals from a desired channel. Accordingly, one sample of the waveform data can be transported between the nodes for each of the 256 transmission channels in each sampling period.

When data transfer in the Ethernet (registered trademark) system of 1 Gbps (gigabit per second) is employed, the time length of the TL frame 100 is 1 nanosecond×8 bits×1282 bytes=10.26 μsec, so that the transmission of the TL frame 100 from the master node is completed in one sampling period.

Next, states of the TL frame shown in FIG. 3 during transport of the audio signals on the sub-network system are shown in FIG. 6.

A sub-network system in which four nodes, the node A to the node D, are cascaded is discussed here. When the TL frame 100 is circulated through the nodes in the system, any one of the nodes is determined as a sub-network master, and only that node generates the TL frame in a new sampling period (a TL frame with a different serial number) and transmits the TL frame generated in each sampling period to the next node. The nodes other than the sub-network master are slave nodes which perform transfer process of receiving the TL frame from their respective preceding nodes and transmitting it to the respective next nodes.

When the sub-network master B first transmits the TL frame, rightward in the drawing, toward the node C in accordance with the timing of a wordclock, the TL frame is transported to the nodes B, C, D, C, B, A, and B in order as shown by the broken line and thus returned to the node B. While the TL frame circulates through the transmission route, each node reads, from the TL frame, the waveform data and the control data which the node should receive from another node, and writes, into the TL frame, the waveform data and the control data which the node should transmit to the other node, during the time period that the TL frame is flashing through the node, namely from reception to transmission of each portion of the TL frame in the node.

When the TL frame returns after circulating through the transmission route, the sub-network master overwrites the management data in the TL frame to generate the TL frame in the later sampling period, and provides it to transmission in an appropriate sampling period. In this event, the sub-network master also reads and writes data from/into the TL frame as with the other nodes.

By repeating the above, one TL frame can be circulated for one sampling period, among the nodes as shown in (a) to (e) in time sequence. In these drawings, a black arrow shows the head of the TL frame, a black circle shows the end of the TL frame, and a bold line connected to the black arrow and/or the black circle shows the TL frame itself. The arrow of a line connected to the bold line is indicating the return of the TL frame to the sub-network master after circulating through the transmission route.

Note that each slave node receiving the TL frame, before the node completes receiving all the TL frame (from the head to the tail), starts to read and write data from/into the TL frame from the head, and further starts to transmit the TL frame from the head to the next node at a timing when the node has received necessary bytes of the TL frame from the head. Thereafter, the slave node performs the reading and writing of data and transmits the TL frame to the end at substantially the same speed as the node receives the TL frame. On the other hand, the sub-network master receives the entire TL frame and then generates a new TL frame based on the contents of the received frame in order to confirm that the TL frame has been normally circulated along the transmission route.

In the cascade style, the TL frame flashes through each of the nodes other than nodes at both ends in the network system twice in one circulation, but the node reads and writes data other than the data of the ITL frame region 107 from/to the TL frame on only one occasion of them. On which occasion the node reads and writes audio data is selectable. In one case, the node reads and writes audio data at the first time when the frame flashes through the node. In another case, the node reads and writes audio data at the time when the frame flashes through the node rightward in the drawing. When the node does not read and write audio data from/to the TL frame, the node overwrites only the transmission source address and transmits the frame to the next node. Regarding an ITL frame, it is preferable that the ITL frame can be transmitted to adjacent nodes in both directions.

Since each node needs to perform buffering at the time of receiving the TL frame, in order to overwrite the data of the TL frame or to absorb the difference in frequency and timing between the network clock on the receiving side (corresponding to the operation clock of the transmission source node) and the network clock on the transmitting side (corresponding to the operation clock of that node), there is a time lag between the timing when the node starts to receive a TL frame and the timing when the node starts to transmit the received frame.

The transport delay of the audio signals transported over the network is in the unit of sampling period and is minimal in a condition that the TL frame transmitted by the sub-network master at a timing of a wordclock in S-th period returns to the sub-network master, after circulating through the transmission route, at a timing earlier than a wordclock in (S+2)-th period by a predetermined time $\alpha$ (corresponding to a time necessary to generate a new TL frame in (S+2)-th period based on the received frame in S-th period).

In this system, by performing data transport in the above-described method, a fixed transport bandwidth according to the size of the TL frame in the network can be secured at all times, as long as the TL frame can circulate through all of the nodes in the system within the limit. The bandwidth is not affected by the magnitude of the data transport amount between specific nodes.

In the case where two transmission routes are formed in the sub-network system in the loop style, as is clear from FIG. 2B, in one transmission route, a TL frame generated and transmitted rightward by the sub-network master B is transported from the node B to the nodes C, D, A, and B in order, and in the other transmission route, a TL frame generated and transmitted leftward by the sub-network master B is transported from the node B to the nodes A, D, C, and B in order. In this case, the TL frame flashes through each of the nodes in the sub-network system once in one circulation along the transmission route, and the node reads data from the TL frame and writes data into the TL frame during the one flash.

1.5 Hardware Configuration and Basic Operation of Devices Constituting System

Next, the hardware for transporting the TL frame as has been described above and its operation will be described.

Figure 7:
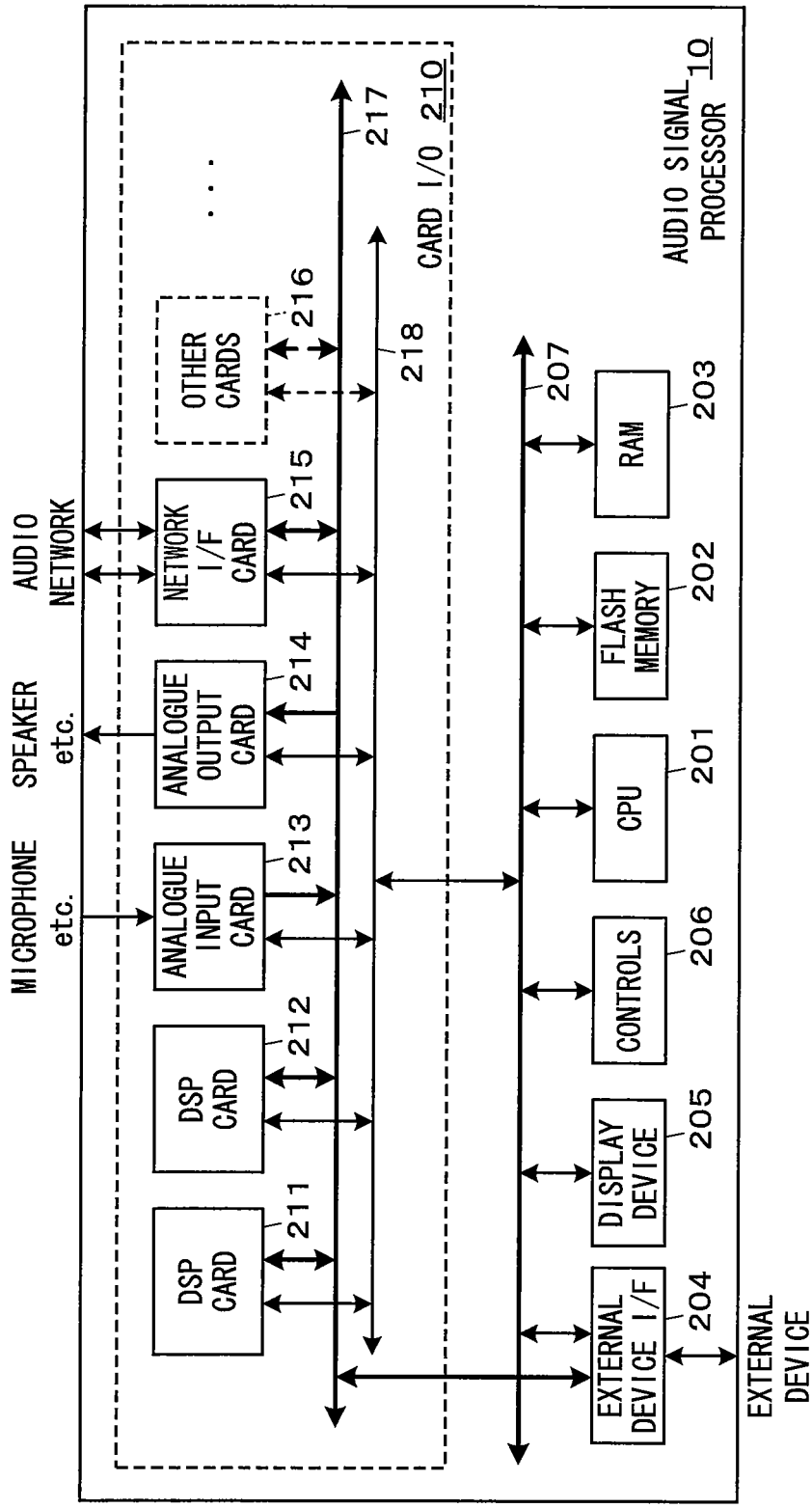
FIG. 7 is a diagram showing the hardware configuration of an audio signal processor that is each of the nodes constituting the audio network system shown in FIG. 1.

The hardware configuration of an audio signal processor that is each of the nodes constituting the above-described audio network system S is shown in FIG. 7.

As shown in FIG. 7, the audio signal processor 10 includes a CPU 201, a flash memory 202, a RAM 203, an external device I/F (interface) 204, a display device 205, and controls 206, which are connected via a system bus 207. The audio signal processor 10 further includes a card I/O (input/output section) 210 connecting the external device I/F 204 and the system bus 207.

The CPU 201, which is a controller that comprehensively controls the audio signal processor 10, can execute a required control program stored in the flash memory 202, thereby controlling display on the display device 205, setting the value of the parameter according to the manipulation of the control 206, controlling the operation of each module, transmitting a command to another audio signal processor via the card I/O 210, and performing process according to the command received from the other audio signal processor via the card I/O 210.

The flash memory 202 is an overwritable non-volatile memory that stores data which should be left even after the power is turned off, such as the control program executed by the CPU 201.

The RAM 203 is a memory that is used to store data which should be temporarily stored and used as a work memory of the CPU 201.

The external device I/F 204 is an interface for connecting various kinds of external devices to perform inputting/outputting, for example, an external display, a mouse, a keyboard for inputting characters, a control panel, a PC (personal computer), and the like.

The external device I/F 204 is also connected to an audio bus 217 of the card I/O 210 and can transmit the waveform data flowing through the audio bus 217 to the external device and input the waveform data received from the external device into the audio bus 217.

The display device 205 is a display device for displaying various kinds of information according to control by the CPU 201, and can be composed, for example, of a liquid crystal display (LCD), a light emitting diode (LED), or the like.

The controls 206 are used for accepting the manipulation to the audio signal processor 10 and can be composed of various keys, buttons, dials, sliders, and the like.

The display device 205 and the controls 206 have configurations greatly different depending on the function of a device such that a large-size display, many buttons, switches, power-faders and so on are provided for accepting setting of signal processing parameters and patches for many channels in the console C1, and simple lamps and buttons for a power supply control and mode setting are provided in the input/output devices IO1 to IO4.

The card I/O 210 is an interface including the audio bus 217 and a control bus 218. The card I/O 210 makes it possible to input and output the audio signals and the control signal to/from the audio signal processor 10, and perform process on the audio signals and the control signal, by attaching various kinds of card modules to these buses. The card modules attached thereto transmit and receive the waveform data to/from each other via the audio bus 217, and transmit and receive the control signal to/from the CPU 201 via the control bus 218 to be controlled by the CPU 201.

The audio bus 217 is an audio signal transporting local bus which transports the waveform data of a plurality of channels from an arbitrary card to an arbitrary card sample by sample in a time division manner at a timing based on the sampling period. Any one of the plurality of connected cards becomes a master, and the reference timing for the time division transport of the audio bus 217 is controlled based on the wordclock generated and supplied by that card. The other cards become slaves and generate wordclocks of the cards based on the reference timing.

More specifically, the wordclock generated in each card is a common clock in synchronization with the wordclock of the card which has become the master node, and a plurality of cards in a node process the waveform data at a common sampling frequency. Each card further transmits and receives the waveform data processed based on its own wordclock and the waveform data which should be processed, to/from the other card via the audio bus 217 at a time division timing based on the above-described reference timing.

Note that when the card having a digital input function of inputting digital audio signals from the external device is the master, the card operates in synchronization with the wordclock accompanying the inputted audio signals, so that the external device that is the supply source of the inputted audio signals is the actual wordclock master.

FIG. 7 shows an example in which DSP (digital signal processor) cards 211 and 212, an analog input card 213, an analog output card 214, and a network I/F card 215 are attached to the card I/O 210.

Each of the various cards attached to the card I/O 210 executes process on the waveform data according to the function of that card at a timing based on the wordclock (sampling period of the waveform data).

The DSP cards 211 and 212 of them are signal processors which perform various kinds of process including mixing, equalizing, and effect addition on the waveform data acquired from the audio bus 217 at a timing based on the wordclock. They output the processed data to the audio bus 217. They can further accept inputs of the waveform data of a plurality of channels and process the waveform data and then output the waveform data of a plurality of channels.

The analog input card 213 includes an A/D (analog/digital) conversion circuit and has a function of converting the analog audio signals inputted from the audio input device such as a microphone to digital waveform data and supplying it to the audio bus 217. The analog input card 213 can process the signals of a plurality of channels in parallel.

The analog output card 214 includes a D/A (digital/analog) conversion circuit and has a function of converting the digital waveform data acquired from the audio bus 217 to analog audio signals and outputting them to the audio output device such as a speaker or the like.

The network card I/F 215 includes two sets of transmission I/Fs and reception I/Fs and has a function of performing transport of the TL frame 100 in the sub-network system which has been described using FIG. 2A to FIG. 6 and a function of reading and writing the waveform data, the control data, and the like from/to the TL frame 100.

It is also possible to attach a plurality of network I/F cards to the card I/O 210. A plurality of network I/F cards are attached to the connecting node like the third input/output device IO3 shown in FIG. 1, so that the third input/output device IO3 is connected to different sub-network systems via the respective network I/F cards, card by card.

The cards other than the network I/F card 215 among the various cards described above can be arbitrarily selected and attached. For example, if the input/output devices IO1 to IO4 shown in FIG. 1 need to perform only signal input/output, the DSP cards 211, 212 are unnecessary. If the mixer engine E1 does not perform signal input and output from/into the outside of the system, the analog input card 213 and the analog output card 214 are unnecessary. Further, if the console C1 performs operation only for parameters, it is not necessary to provide the cards other than the network I/F card 215.

Conversely, it is conceivable that various kinds of card modules such as a digital input/output, a tone generator, a recorder, an effector, and so on can be attached as another card 216 in addition to the aforementioned cards.

As described above, the cards attached to the card I/O 210 process audio signals according to the common wordclock. When the audio signal processor 10 is the master node in the audio network system S, one of the attached cards supplies the wordclock to the other cards including the network I/F card 215, and the network I/F card 215 transmits the TL frame in each sampling period, as the sub-network master of the sub-network system which the audio signal processor 10 belongs to. When the audio signal processor 10 is the slave node in the audio network system S, the network I/F card 215 generates (reproduces) a wordclock based on the reception timing of the TL frame and supplies the wordclock to the other cards attached to the card I/O 210.

Figure 8:
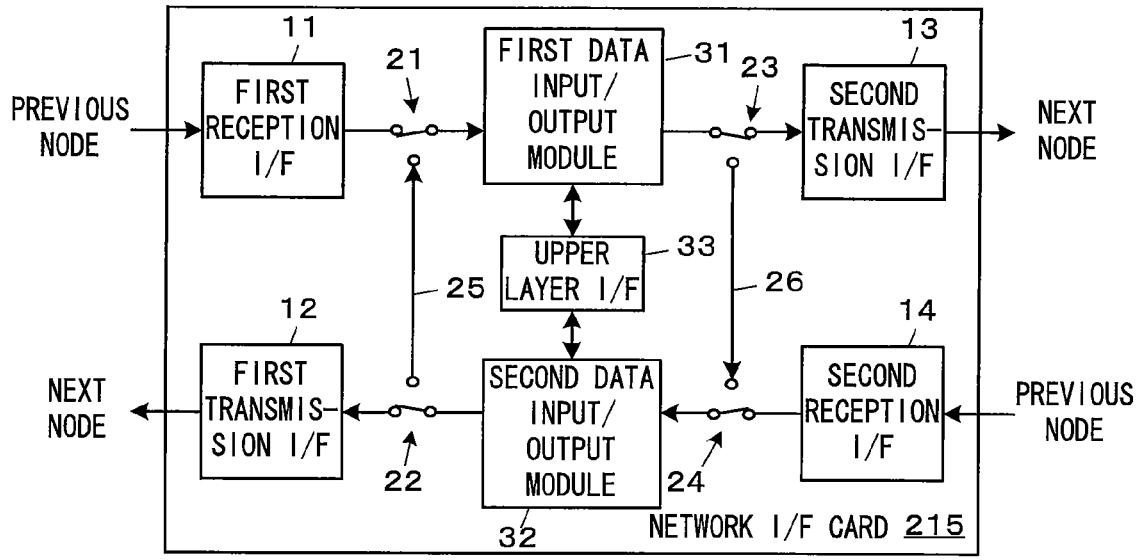
FIG. 8 is a diagram showing, in more detail, the function relating to transport of the TL frame in the network I/F card shown in FIG. 7.

Next, the function of the network I/F card 215 relating to transport of the TL frame 100 is shown in more detail in FIG. 8.

As shown in FIG. 8, the network I/F card 215 includes first and second reception I/Fs 11 and 14 and first and second transmission I/Fs 12 and 13, and also includes selectors 21 to 24 for switching the transport direction of the TL frame 100, first and second data input/output modules 31 and 32 reading and writing data from/into the TL frame 100, and an upper layer I/F 33 that is the interface for inputting and outputting data from/into the audio bus 217 and the control bus 218 and is the interface with parts other than the network I/F card 215 in the audio signal processor 10.

Among them, the first and second reception I/Fs 11 and 14, and the first and second transmission I/Fs 12 and 13 are communication devices corresponding to the two sets of reception I/Fs and transmission I/Fs shown in FIG. 2A and FIG. 2B, each including a predetermined connector (a female side) for connecting a communication cable thereto. For connection of the communication cable, the first reception I/F 11 and the first transmission I/F 12 shall be one set, and the second transmission I/F 13 and the second reception I/F 14 shall be one set. These I/Fs can be I/Fs which perform data communication according to any communication standard as long as they have enough ability for transport of the TL frame in the above-described one sampling period, and an I/F performing data transfer according to the Ethernet of 1 Gbps is employed here.

Each of the first and second data input/output modules 31 and 32 operates based on the operation clock generated by a not-shown operation clock generating module, and functions as a reader that reads desired data such as the waveform data and control data from the TL frame 100 received by a corresponding reception I/F, and a writer that writes desired data such as the waveform data and control data into the received TL frame 100.

Besides, as can be seen from FIG. 2A and the like, the transmission destination of the TL frame 100 from a node that has received the frame may be a device other than the transmission source of the TL frame 100 (the case of the node B in FIG. 2A) or may be the same device as the transmission source (the case of the nodes A and C in FIG. 2A). In the former case, the TL frame 100 is transmitted from a transmission I/F in the pair other than the pair whose reception I/F has received the TL frame 100, whereas in the latter case, the TL frame 100 is transmitted from a transmission I/F paired with the reception I/F which has received the TL frame 100.

The selectors 21 to 24 are provided to switch the transmission destination as described above.

The selectors 23 and 24 among them are selectors for selecting a transmission I/F, among the second transmission I/F 13 and the first transmission I/F 12, from which the TL frame received by the first reception I/F 11 and passed through the first data input/output module 31 is outputted.

The selectors 23 and 24 operate in cooperation such that when the selector 23 selects the second transmission I/F 13 side, the TL frame received by the first reception I/F 11 is transmitted from the second transmission I/F 13, while the selector 24 selects the second reception I/F 14 side to input the TL frame received by the second reception I/F 14 into the second data input/output module 32.

Conversely, when the selector 23 selects the loopback line 26 side, the selector 24 also selects the loopback line 26 side so that the TL frame received by the first reception I/F 11 passes through the loopback line 26 and the second data input/output module 32, and is transmitted from the first transmission I/F 12.

The loopback is based on the assumption that the selector 22 selects the first transmission I/F 12 side. The selectors 21 and 22 also operate in cooperation, similarly to the selectors 23 and 24, such that when the TL frame received by the first reception I/F 11 passes through the first data input/output module 31, the selector 21 selects the first reception I/F 11 side and the selector 22 selects the first transmission I/F 12 side in cooperation. Accordingly, it is possible to select whether or not to loopback the TL frame received by the first reception I/F 11, by switching the selectors 23 and 24.

Similarly, it is also possible to select whether the TL frame received by the second reception I/F 14 and passes through the second data input/output module 32 is looped back or not, by switching the selectors 21 and 22, that is, whether the selectors 21 and 22 select the loopback line 25 side or the other side.

Note that when the TL frame is looped back, the TL frame flashes through both the first and second data input/output modules 31 and 32 in the network I/F card 215. Any one of the first and second data input/output modules 31 and 32, for example, only the module which the TL frame first flashes through needs to read and write data from/into the TL frame.

The frame received by the first reception I/F 11 in the state where the selector 21 selects the loopback line 25 and the frame received by the second reception I/F 14 in the state where the selector 24 selects the loopback line 26 (reception of the aforementioned ITL frame is conceivable) are supplied to a not-shown processing module and subjected to analysis of substance thereof and process according to contents thereof.

In the audio signal processor 10, the function relating to the transport of the TL frame as described using FIG. 2A to FIG. 6 can be realized by the hardware of the network I/F card 215 performing the above-described operation. For more concrete hardware configuration, the configuration described in, for example, Japanese Patent Laid-open Publication No. 2009-94589 can be employed except the part relating to later-described generation of the wordclock.

2. Connection of Sub-Network Systems in Connecting Node
2.1 Procedure of Forming Transmission Routes in Audio Network System Characteristic points of this embodiment are the operation of the connecting node (the third input/output device IO3 in the example of FIG. 1) connecting the first sub-network system S1 and the second sub-network system S2, and the operation of the master node (the fourth input/output IO4 in the example of FIG. 1) relating to this connection. Hence, these points will be described below.

Figure 9:
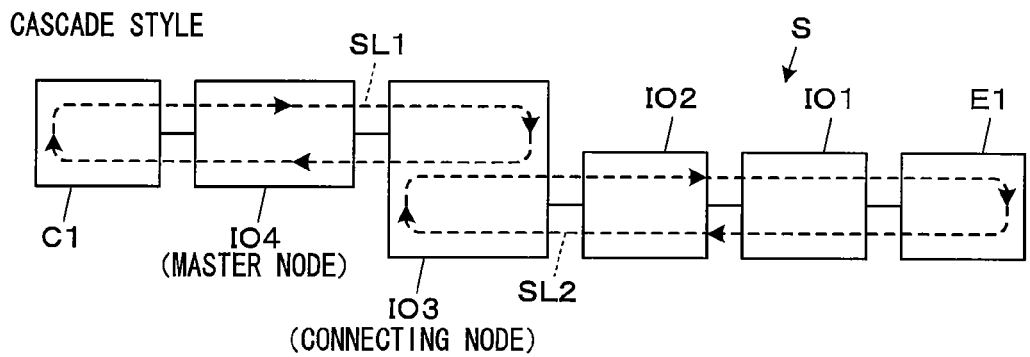
FIG. 9 is a diagram showing transmission routes for the TL frame formed among nodes in the audio network system shown in FIG. 1 when the nodes are connected to form a cascade in each sub-network system.
Figure 10:
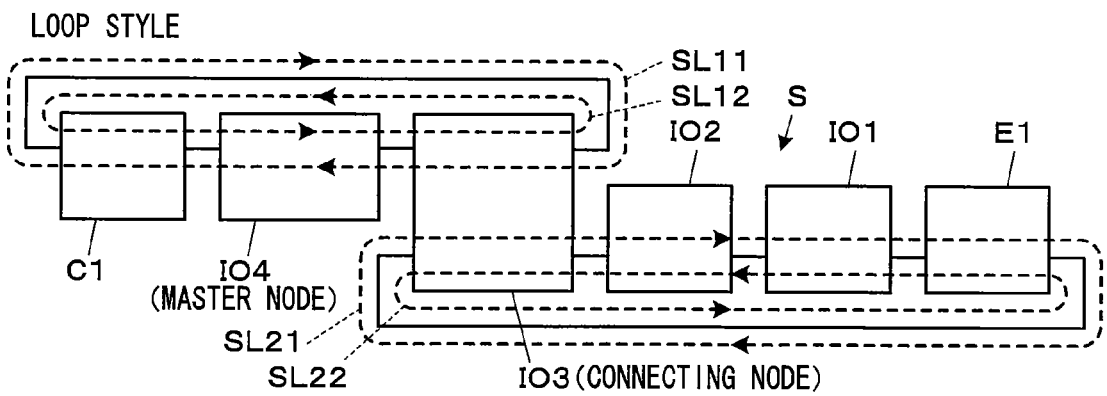
FIG. 10 is a diagram showing transmission routes for the TL frame when the nodes are connected to form a loop in each sub-network system.

The transmission routes for the TL frame formed among nodes in the audio network system S shown in FIG. 1 are shown in FIG. 9 and FIG. 10. FIG. 9 shows an example when the nodes are connected to form a cascade in each sub-network system, and FIG. 10 shows an example when the nodes are connected to form a loop in each sub-network system.

In the cascade style as shown in FIG. 9, one loop transmission route looped back in nodes at both ends is formed in each sub-network system. The formed transmission routes are a transmission route SL1 in the first sub-network system S1 and a transmission route SL2 in the second sub-network system S2.

On the other hand, in the loop style as shown in FIG. 10, two transmission routes each passing through once all of the nodes are formed in each sub-network system. The formed transmission routes are transmission routes SL11 and SL12 in the first sub-network system S1 and transmission routes SL21 and SL22 in the second sub-network system S2.

In either case, all of the transmission routes formed in both of the sub-network systems S1 and S2 pass through the connecting node (103).

Further, in either case, the transmission route is firstly formed for the sub-network system including the master node (104 in the example of the drawings) employing the master node as its sub-network master, and the transmission route in the other sub-network system is then formed employing the connecting node (IO3 in the example of the drawings) as its sub-network master.

This basically applies to the case when the connecting node is the master node. More specifically, in this case, the connecting node is the sub-network masters in both sub-network systems. Further, in this case, both of the two network I/F cards in the connecting node operate based on the wordclock generated by one of the network I/F cards or supplied from the external device, and the two network I/F cards transmit the timing of the wordclock to the nodes in the sub-network systems with which the two network I/F cards are connected.

Figure 11:
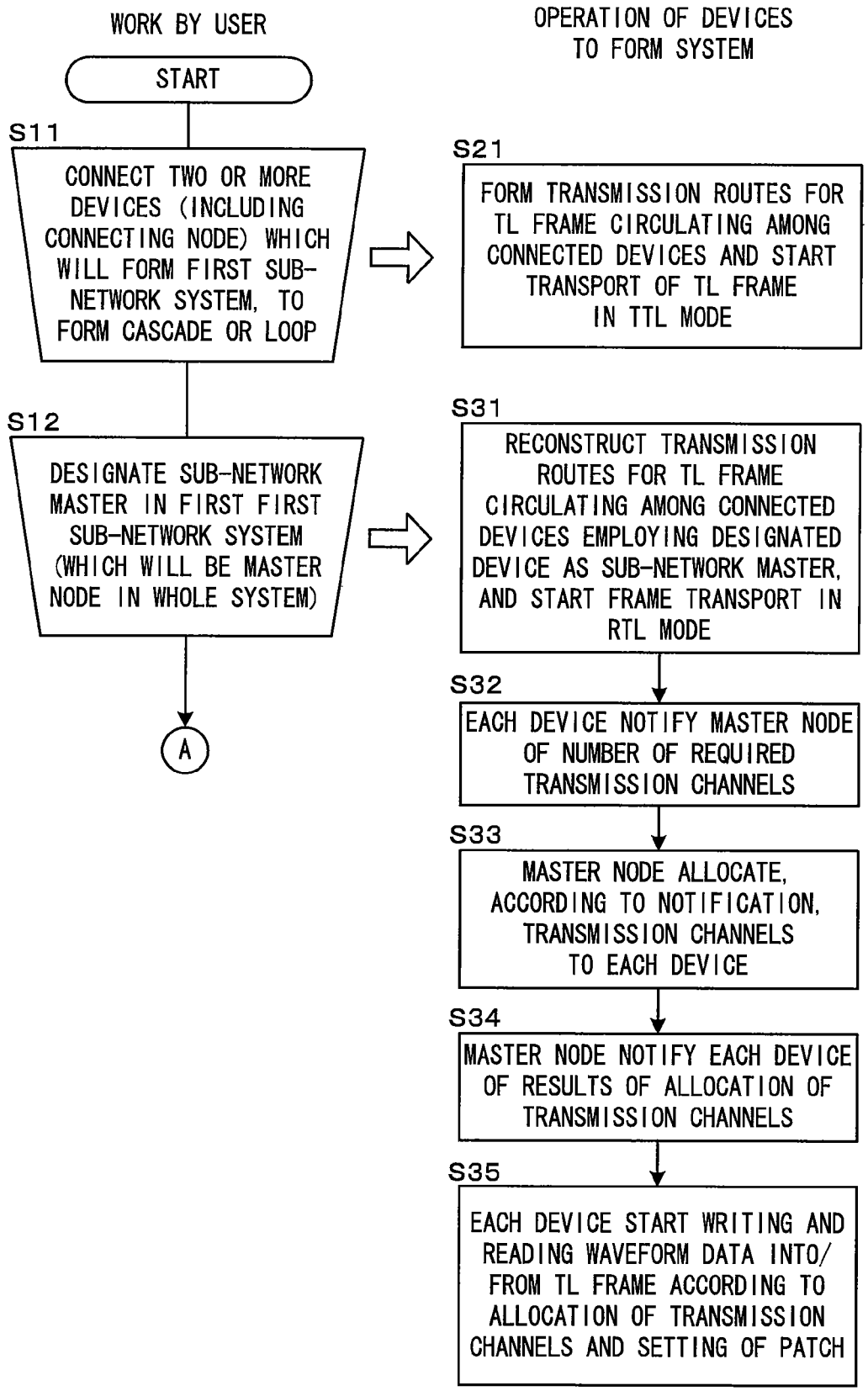
FIG. 11 is a chart showing the work by the user and the operation procedures of devices according to the work when forming the audio network system and the transmission routes for the TL frame.
Figure 12:
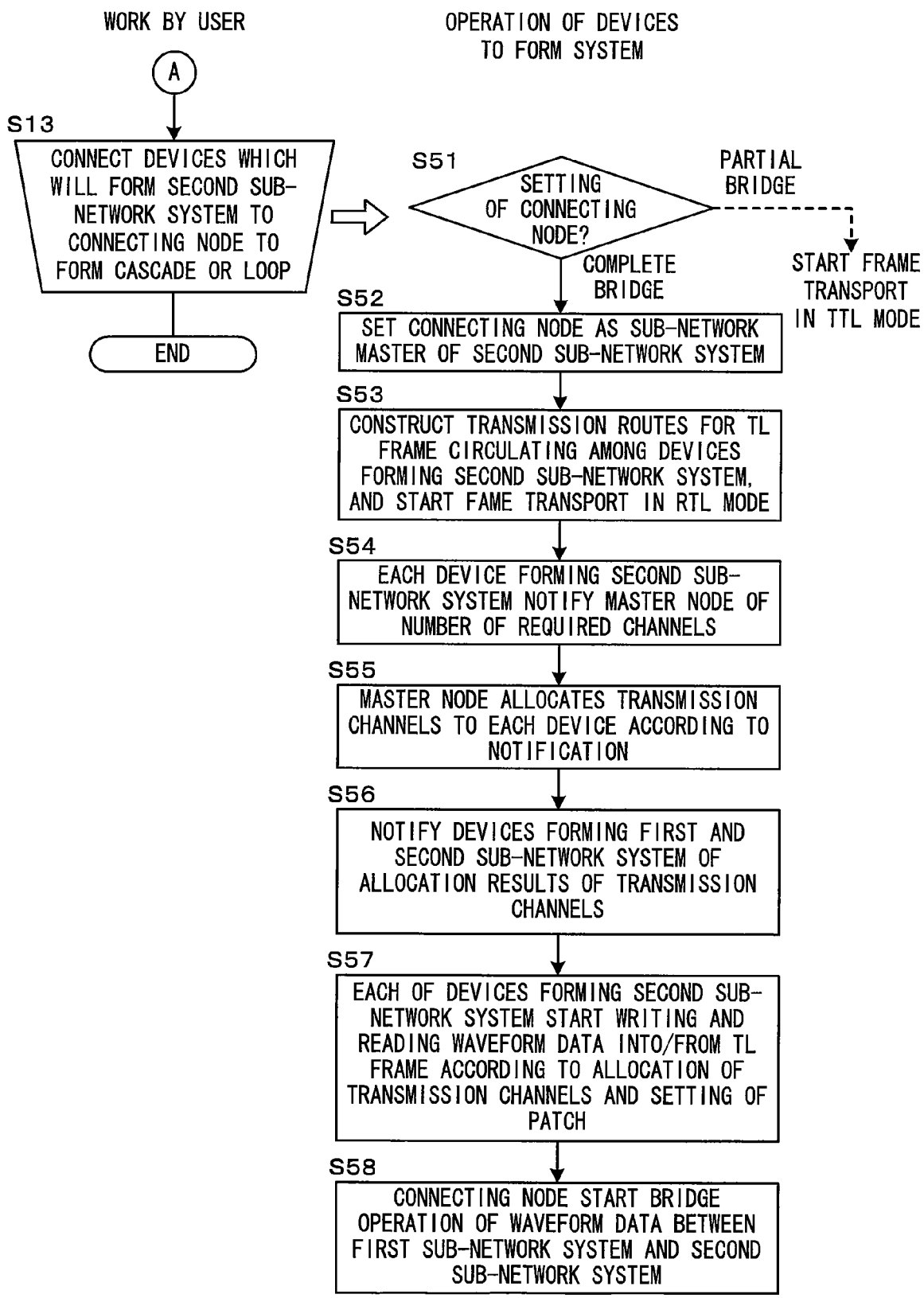
FIG. 12 is a chart showing continuation of the work and the operation procedures in FIG. 11.

Next, FIG. 11 and FIG. 12 show the work by the user and the operation procedures of devices according to the work when forming the audio network system S and the above-described transmission routes for the TL frame. These drawings show the procedures when forming the transmission routes from the state in which the devices are not physically connected to none another.

When forming the audio network system S shown in FIG. 1, the user first connects two or more devices which will form the first sub-network system S1, to form a cascade or a loop (S11). In this event, at least one of the devices needs to be the device which will be the connecting node. Further, the "connection" referred to here includes coupling devices which have been already turned on by a communication cable, turning on devices which have been already coupled by a communication cable, and coupling devices which have not been coupled and turned on yet, by a communication cable and turning on the devices.

After the connection is established, the connected devices automatically confirm the presence of their target devices one another and the topology of the connection (cascade or loop, and connection order of the devices), then form the transmission routes for the TL frame shown in FIG. 9 or FIG. 10 circulating among the connected devices according to the topology, and start transport of the TL frame along the transmission routes (S21).

However, the devices do not read and write the waveform data from/into the TL frame at this stage but operate in the mode (TTL mode) of transmitting control data among the devices using the ITL frame region 107 and the control data region 104 in the TL frame 100. Further, a temporal sub-network master which generates the TL frame is determined by an appropriate algorithm after negotiation among the devices.

As the procedure of forming the transmission routes in this event, the one described in, for example Japanese Patent Laid-open Publication No. 2009-94589 can be employed.

Further, after Step S11, the user designates the sub-network master in the first sub-network system S1 (S12). This sub-network master is a node that will be the master node in the whole audio network system S. This designation is performed preferably, but not necessarily, after completion of Step S21.

After the designation in Step S12, the devices operating in the TTL mode reconstruct the transmission routes for the TL frame circulated among the connected devices employing the node designated in Step S12 as the sub-network master, and start the transport of the TL frame in the mode (RTL mode) capable of reading and writing of the waveform data from/into the TL frame this time (S31).

Thereafter, each device notifies the master node (here, coinciding with the sub-network master of the sub-network system which the device belongs to) of the number of transmission channels the device requires (S32). The number of channels notified here indicates that the device writes waveform data of how many channels into the TL frame 100. This value can be the value which the user has previously determined or the value which is automatically determined according to the number of input terminals (input ports) the device includes (in the case where the waveform data inputted from the outside is written) or output channels (in the case where the waveform data processed in the device is written). Note that the number of channels required by the device may be sometimes zero, in which case the device does not need allocation of channels and therefore does not need to notify the number of required channels.

Note that the notification in Step S32 can be performed through the Ethernet frame, addressed to the mater node, which is written in the control data region 104 of the TL frame 100 or by sending the ITL frame which is written in the ITL frame region 107 to the master node through sequential relay to the adjacent node. This also applies to the communication between the master node and each device.

Meanwhile, the master node, after receiving the notification in Step S32, allocates, according to the notification, transmission channels in the TL frame 100 to the device which has originated the notification (S33). There is no problem in allocating any channel to any device, any algorithm is employable, such as allocation of channels from the first notification on a first-come-first-served basis or the like. However, the number of the transmission channels has a limit, and therefore the master node cannot allocate any transmission channel in some case. In such a case, it is preferable to notify the user of the impossibility by any means such as display by the console C1, lighting of a predetermined lamp or the like. However, even if the allocation is impossible, the device to which no transmission channel has been allocated just cannot write the waveform data into the TL frame 100 but can read the waveform data from the TL frame 100, and is not affected regarding the other operations of the device and operations of the other devices.

The master node further notifies each device of the results of the allocation performed in Step S33 (S34). The notification of the allocation result is preferably performed every time new allocation is performed, namely, every time the allocation is changed because each device determines the transmission channel into which the device writes the waveform data referring to the present allocation of the transmission channels.

Each device, when it receives the notification in Step S34, starts writing and reading the waveform data into/from the TL frame according to the allocation of the transmission channels and the setting of patch (S35). The above processes bring the first sub-network system into a state in which the audio signals and the control signals can be transmitted and received among the devices which are the nodes.

The patch here means, regarding writing of the waveform data into the TL frame, data defining the correspondence between the ID of an input terminal (an input port) or an output channel from which the waveform data is supplied and the number of the transmission channel, among the transmission channels allocated to the device, into which the device writes the supplied waveform data. The patch means, regarding reading of the waveform data from the TL frame, data defining the correspondence between the number of the transmission channel among the transmission channels allocated to the device from which the device reads the waveform data and the position of an input channel or an output terminal (an output port) of the device to which the device supplies the read waveform data.

The patch can be arbitrarily set by the user using a predetermined interface and a default value for each device is prepared in the initial state.

The setting of transmission and reception of the waveform data in each device can be performed as follows.

The console C1 first acquires, from the devices (including the mixer engine), data of the input ports and the output ports for the waveform data included in the devices and the input channels and the output channels included in the mixer engine. Then, the display device of the console C1 displays an input patch setting screen to accept setting of the patch from the input ports of the devices to the input channels of the mixer engine and an output patch setting screen to accept setting of the patch from the output channels of the mixer engine to the output ports of the devices, and accepts patch setting by the user.

When the console accepts the setting of the patch (connection) from the supply source (one input port or output channel) of the waveform data to the supply destination (one input channel or output port), the console performs transmission setting for the device including the supply source to transmit the waveform data from the supply source, and performs reception setting for the device including the supply destination to receive the waveform data from the supply source and supply the waveform data to the supply destination.

The device for which the transmission setting has been performed reserves an unused channel among the transmission channels allocated to the device, as a channel to be used for transmission of the waveform data from the supply source for which the transmission setting has been performed, and sets (writing setting) the patch in the device so that the waveform data from the supply source is written into the region of the reserved channel in the TL frame. The device then notifies all of the devices in the first sub-network system S1 and the second sub-network system S2 of the transmission data indicating that the waveform data from the supply source is written in the reserved channel.

The device for which the reception setting has been performed judges whether or not the signal from the supply source, for which the reception setting has been performed, is written in the region of any transmission channel in the TL frame based on the transmission data sent from other devices, and reads, when the signal is written, the waveform data from the region of the transmission channel in the TL frame and sets (reading setting) the patch in the device so that the read waveform data is supplied to the supply destination for which the reception setting has been performed.

As described above, the setting of transmission or reception in each device can be performed based on the patch setting operation by the user on the console. Note that the patch setting operation may be performed on a PC connected to the external device I/F 204. In this case, the operation of the console described here is performed in cooperation by the PC and the device to which the PC is connected. Further, the performed transmission setting and reception setting may be stored in a non-volatile memory in each device so that at power-on of the device, the connection before power-off is automatically restored based on the stored transmission setting and reception setting.

Next, the procedure proceeds to a part shown in FIG. 12, in which the user connects devices which will form the second sub-network system S2 to the connecting node to form a cascade or a loop (S13). In this event, the network I/F card in the connecting node which is not used for the connection in Step S11 is used for the connection.

After the connection is established, the connecting node confirms whether the connection setting effective in the node is a complete bridge or a partial bridge (S51).

The complete bridge means the connection mode in which the allocation of transmission channels is made common in the first sub-network system S1 and the second sub-network system S2 to make it possible to commonly use the waveform data of all of the transmission channels, and is described in detail in this specification. On the other hand, the partial bridge means the connection mode in which only the audio signals and the control signals which need to be transported across the sub-network systems are transported to a different sub-network system, and is not described in detail in this specification.

The connecting node is operable in either connection mode according to the setting. In the partial bridge, the TL frame is circulated in the TTL mode in the second sub-network system for waiting for the subsequent setting. In the complete bridge, the procedure proceeds to the process in Step S52 and subsequent thereto.

The devices connected in Step S13 then automatically confirm the presence of their target devices one another and the topology of the connection, and then set the connecting node as the sub-network master of the second sub-network system (S52), and form the transmission routes for the TL frame shown in FIG. 9 or FIG. 10 circulating among the devices forming the second sub-network system, according to the topology, and start transport of the TL frame along the transmission routes in the RTL mode (S53).

Though detailed explanation is omitted, it is also conceivable that the devices forming the second sub-network system are connected to the connecting node by connecting one end of the cascade to the connecting node while the TL frame is being transported in the RTL mode in Step S13. In this case, one of the already formed first sub-network system and the system formed by the newly connected devices is selected based on the priorities of the systems (the system at a lower priority is selected) and the selected system is once deconstructed, and the devices in the deconstructed system are then incorporated into the audio network system.

In this case, when the system formed by the newly connected devices is deconstructed, it is only necessary to reset all of the network I/F cards in those devices, once cancel the allocation of the transmission channels among the devices, and then perform the process in FIG. 12. Conversely, when the first sub-network system which has been already formed is deconstructed, it is only necessary to set the master node (or sub-network master) of the system formed by the newly connected devices as the master node of the audio network system S, regard the sub-network system including the node as a new first sub-network system, reset the network I/F cards in the devices which have formed the first sub-network system until then (only the network I/F card connected to the first sub-network system regarding the connecting node), once cancel the allocation of the transmission channels among the reset devices, and then perform the process in FIG. 12 assuming that the reset devices are connected to the connecting node in Step S13.

In either case, after Step S53, each of the devices forming the second sub-network system S2 notifies the master node (the sub-network master in the first sub-network system) of the number of transmission channels that the device requires via the connecting node (S54). The connecting node reads the Ethernet frame or the ITL frame relating to the notification from the TL frame circulated in the second sub-network system S2, and then writes the Ethernet frame or the ITL frame for transporting the notification to the master node into the TL frame 100 circulated in the first sub-network system S1, thereby mediating the transport of the notification.

The master node, when it receives the notification in Step S54, allocates transmission channels in the TL frame 100 to the device that is the notification source according to the notification as in the case of Step S33 (S55), and notifies all of the devices constituting the first and second sub-network systems of the allocation results (S56). The notification of the allocation result to the devices constituting the second sub-network system will be delivered via the connecting node.

Each of the devices constituting the second sub-network system, when it receives the notification in Step S56, starts writing and reading the waveform data into/from the TL frame according to the allocation of the transmission channels and the setting of patch (S57). The above processes bring the second sub-network system into a state in which the audio signals and the control signals can be transmitted and received among the devices which are the nodes.

After the above processes, the connecting node starts the bridge (transport mediation) operation of the waveform data between the first sub-network system S1 and the second sub-network system S2 (S58). This bridge operation makes it possible for a node in the second sub-network system S2 to read the waveform data that a node in the first sub-network system S1 has written into the TL frame, or conversely for a node in the first sub-network system S1 to read the waveform data that a node in the second sub-network system S2 has written into the TL frame. In other words, the waveform data can be passed between the nodes in the first sub-network system and the nodes in the second sub-network system.

The bridge operation will be described later in detail.

Figure 13:
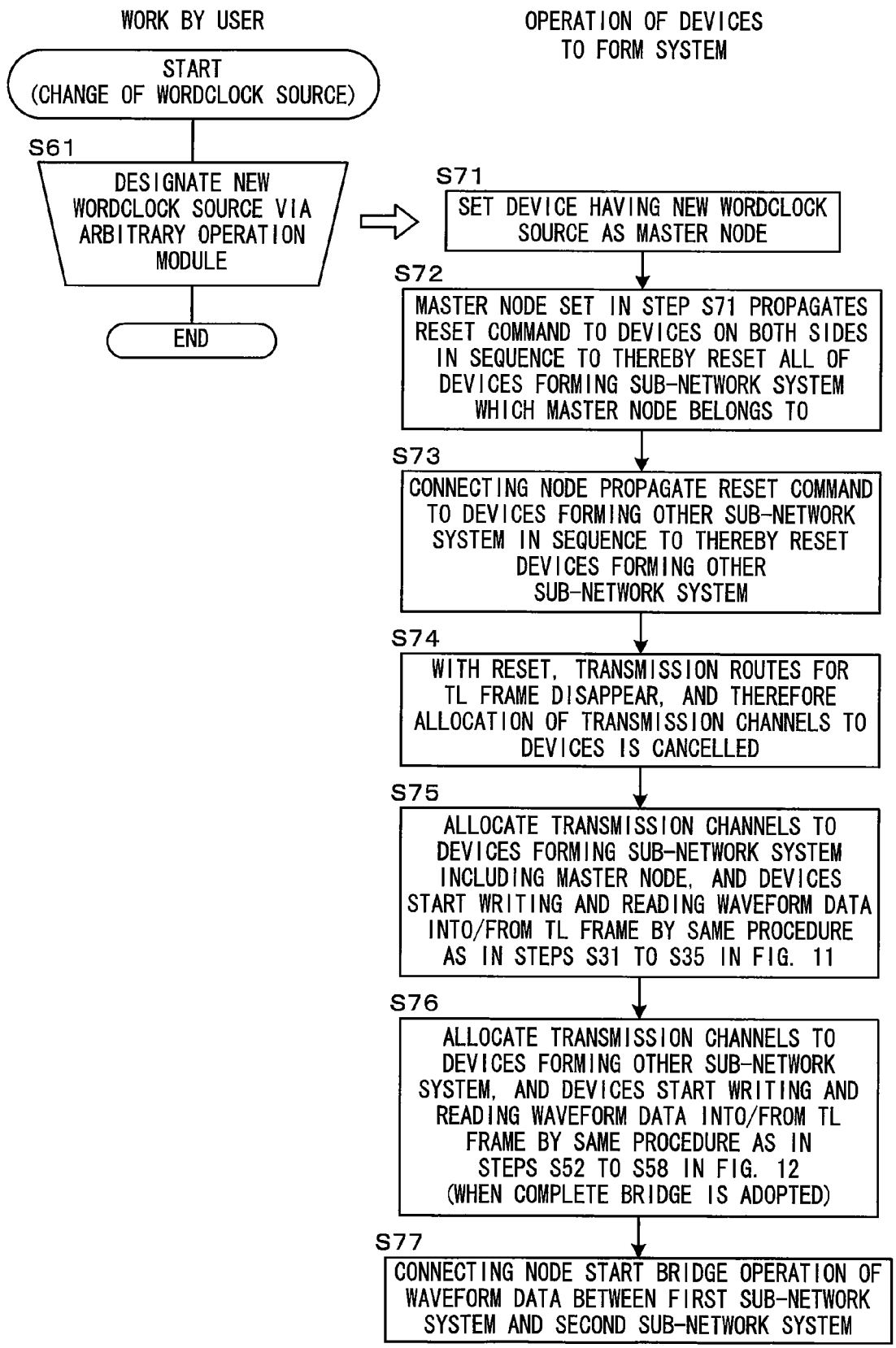
FIG. 13 is a chart showing the procedures, corresponding to those in FIG. 11 and FIG. 12, when reconstructing the system, from the state in which the audio network system has been already formed, using a node different from the node until then, as the master node.

Next, FIG. 13 shows the procedures, corresponding to those in FIG. 11 and FIG. 12, when reconstructing the system, from the state in which the audio network system S has been already formed, using a node different from the master node until then, as the master node.

In this case, the user designates a desired card (and input port) of a desired device as a new wordclock source via an arbitrary operation module (for example, the console C1) (S61).

Upon designation in Step S61, the devices constituting the audio network system S transport, from the device accepting the designation operation to the device which is newly designated as the wordclock source, a command indicating that the device is designated as the master node using the Ethernet frame or the ITL frame, and the device received the command sets the device itself as the master node (S71).

Thereafter, the device set as the master node propagates a reset command to the devices on both sides in sequence and resets the device itself to thereby reset all of the devices, including the device itself, forming the sub-network system which the device belongs to (S72). Further, the connecting node which has received the reset command propagates the reset command also to the devices in the other sub-network system in sequence to thereby reset all of the devices constituting the other sub-network system (S73).

Accordingly, in Step S72 and Step S73, all of the devices constituting the audio network system S are reset. In each of the devices in the reset state, all of the selectors 21 to 24 shown in FIG. 8 select the loopback lines 25 and 26 sides. Therefore, with the reset, the loop transmission routes in the sub-network system disappear. Further, the transport of the TL frame is no longer performed, and the allocation of the transmission channels to the devices is also cancelled (S74).

However, the device set as the master node keeps grasping, even after the reset, the fact that the device itself should be the master node at forming of the system.

Then, after completion of the reset of all of the devices, the devices having been connected to form a cascade or a loop with the master node form the first sub-network system S1 using the master node as the sub-network master, the master node allocates transmission channels to the devices forming the first sub-network system S1, and the devices forming the first sub-network system S1 start writing and reading the waveform data into/from the TL frame according to the allocation and the patch, by the same procedure as in Steps S31 to S35 in FIG. 11 (S75).

Thereafter, the devices having been connected to form a cascade or a loop with the network I/F card that does not form the first sub-network system S1 in the connecting node form the second sub-network system S2 using the connecting node as the sub-network master, the master node allocates transmission channels to the devices forming the second sub-network system S2, and the devices forming the second sub-network system S2 start writing and reading the waveform data into/from the TL frame according to the allocation and the patch, by the same procedure as in Steps S52 to S58 in FIG. 12 (S76). The operation in the partial bridge is different from the above operation, but the explanation thereof will be omitted.

After the above processes, the connecting node starts the bridge of the waveform data between the first sub-network system S1 and the second sub-network system S2 (S77), so that the waveform data can be passed between the nodes in the first sub-network system S1 and the nodes in the second sub-network system S2 as in Step S58 in FIG. 12.

Through the above procedure, the audio network system S can be reconstructed with the wordclock source changed.

It is also possible to designate the node which has belonged to the second sub-network system S2 as the wordclock source in Step S61. In this case, the part that has been the second sub-network system before the reconstruction becomes the first sub-network system after the reconstruction, and the part that has been the first sub-network system before the reconstruction becomes the second sub-network system after the reconstruction.

2.2 Bridge of Waveform Data in Connecting Node

Next, the operation for the bridge of the waveform data performed by the connecting node will be described.

Figure 14:
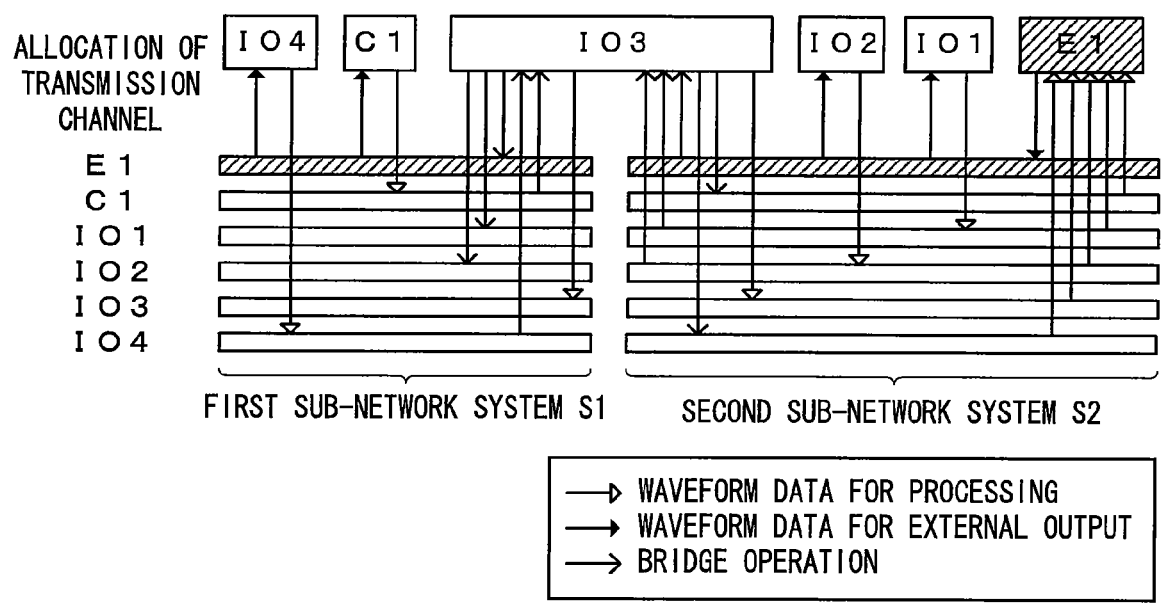
FIG. 14 is an illustration schematically showing the data flow in reading and writing of the waveform data from/into the TL frame performed by the devices constituting the audio network system.

FIG. 14 schematically shows the data flow in reading and writing of the waveform data from/into the TL frame performed by the devices constituting the audio network system S.

In this drawing, three kinds of arrows indicate the positions in the waveform data region from which the devices read data and the positions in the waveform data region into which the devices write data in the first sub-network system S1 and the second sub-network system S2.

Six bands each in the first sub-network system S1 and the second sub-network system S2 respectively indicate regions corresponding to the waveform transmission channels allocated to the six devices shown in FIG. 1 in the waveform data region 103 in each of the TL frames 100 circulated in the first sub-network system S1 and the second sub-network system S2. Note that as has been described using FIG. 4, the allocation of the waveform transmission channels to the six devices are common in the first sub-network system S1 and the second sub-network system S2.

The arrow extending from a box indicating the device to the waveform data region means that the device writes the waveform data into the region, and the arrow extending from a waveform data region to the box indicating the device means that the device reads the waveform data from the region. Regarding the third input/output device IO3, the arrows, which are illustrated between the third input/output device IO3 and the waveform data regions both in the first and second sub-network systems, mean that the third input/output device IO3 reads and writes the waveform data from/into both waveform data regions. However, as described above, the network I/F card to be used in the reading and writing is different for each sub-network system.

Regarding the kinds of the arrows, the arrow with a white tip indicates reading and writing of the waveform data to be supplied for the signal processing by the mixer engine E1. The arrow with a black tip indicates reading and writing of the waveform data to be outputted to the outside. These two kinds of arrows show examples of reading and writing in the drawing, and one or both of reading and writing of the waveform data is not performed in some cases depending on the setting of the patch made in each device.

Besides, the arrow with a line tip indicates reading and writing of the waveform data for the bridge operation by the connecting node. This reading and writing is executed at all times irrespective of the settings of the patch in each device as long as the first and second sub-network systems continue operations.

Note that when the waveform data is written into the region of a transmission channel of the TL frame, the waveform data will be written over the waveform data which has been written in the region in a previous sample period. Therefore, a plurality of devices cannot write the waveform data into one waveform transmission channel. However, even if the waveform data is read, the reading never affects the waveform data written in the TL frame. Therefore, a plurality of devices can read the waveform data from one waveform transmission channel.

Based on the above state, the flow of process in the system from when the waveform data is inputted into the audio network system S to when the waveform data is outputted from the audio network system S will be described together with the operations of the devices with reference also to FIG. 15.

Figure 15:
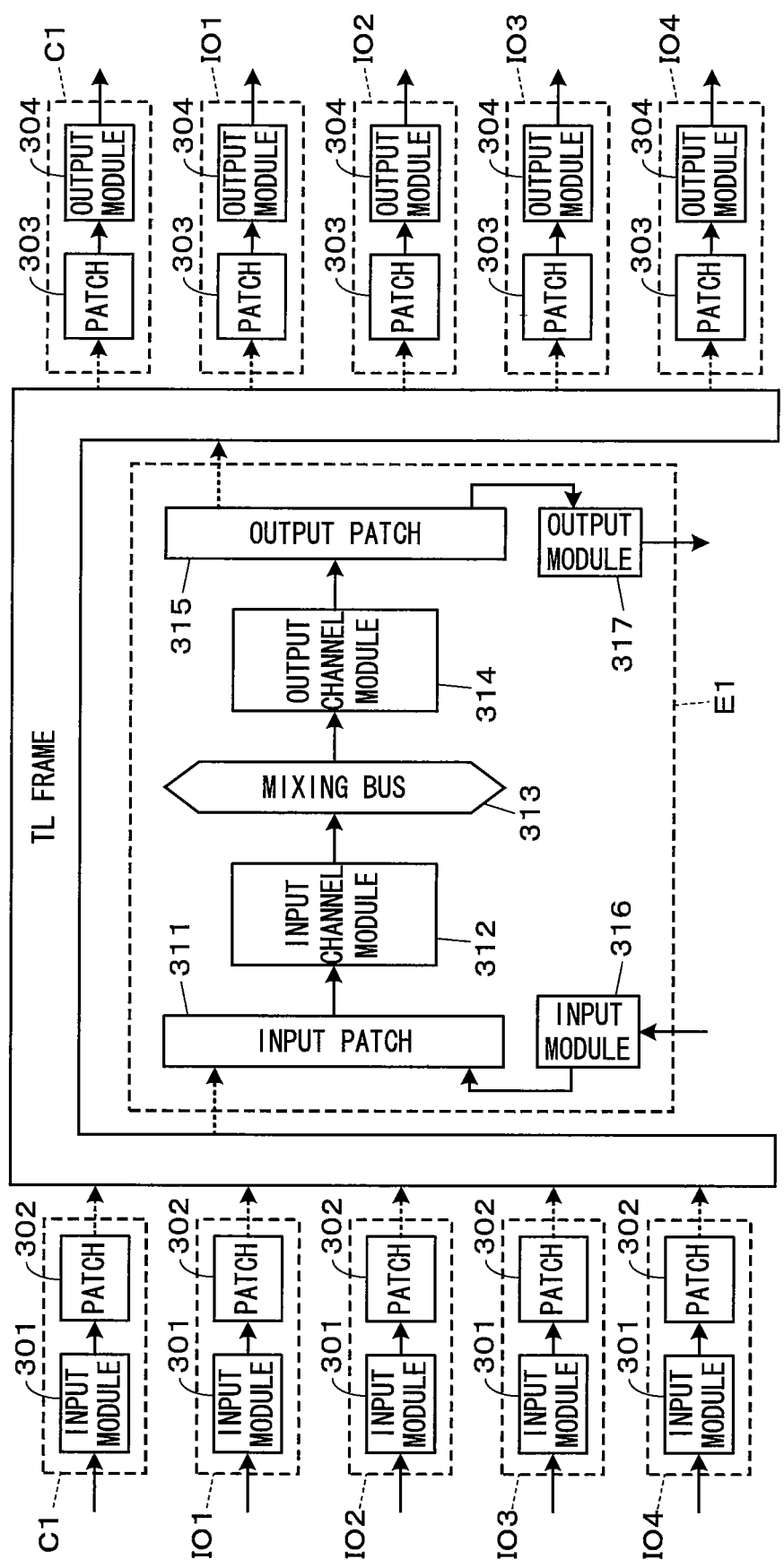
FIG. 15 is a functional block diagram showing the functions implemented by the operations of the devices constituting the audio network system.

FIG. 15 is a functional block diagram showing the functions implemented by the operations of the devices constituting the audio network system S.

In the example shown in FIG. 14 and FIG. 15, the waveform data is inputted into the audio network system S through all of the first to fourth input/output devices IO1 to IO4 and the console C1.

Further, as shown in FIG. 15, in each of the first to fourth input/output devices IO1 to IO4 and the console C1, a patch 302 is set in advance in such a manner that the transmission channels in the TL frame allocated to the device are corresponded with any number of terminals (or ports) included in an input module 301 of the device respectively. Each of the first to fourth input/output devices IO1 to IO4 and the console C1 then writes the waveform data (which may be obtained by AD converting analog audio signals or may be obtained as digital signals) inputted through each terminal of the input module 301 into the region, in the TL frame, of the transmission channel corresponded with the terminal.

In this event, the destination into which the waveform data is actually written is the TL frame in the sub-network system which the device belongs to. Further, the third input/output device IO3 belongs to two sub-network systems and therefore writes the waveform data into the TL frames in both of the two sub-network systems. At this stage, each waveform data has been inputted only into the sub-network system which the device performed writing of the waveform data belongs to.

Hence, in addition to the above-described writing, the third input/output device IO3 performs processes of transporting the waveform data inputted into the first sub-network system S1 to the second sub-network system S2 and transporting the waveform data inputted into the second sub-network system S2 to the first sub-network system S1 as the bridge operation as shown in FIG. 14.

Specifically, the third input/output device IO3 reads the waveform data from the waveform data region, in the TL frame circulated in the first sub-network system S1, of the transmission channels allocated to the devices belonging to the first sub-network system S1 and writes the read waveform data into the corresponding positions (positions of the same transmission channels) in the waveform data region in the TL frame circulated in the second sub-network system S2. In addition to the above operation, the third input/output device IO3 reads the waveform data from the waveform data region, in the TL frame circulated in the second sub-network system S2, of the transmission channels allocated to the devices belonging to the second sub-network system S2 and writes the read waveform data into the corresponding positions (positions of the same transmission channels) in the waveform data region in the TL frame circulated in the first sub-network system S1.

In this event, the correspondence is managed on a transmission channel basis. Further, for the reading and writing, the third input/output device IO3 does not have to concern about whether or not the waveform data has been actually written in the transmission channels, and which device will read out the written waveform data afterwards. The third input/output device IO3 may judge the transmission channel which the waveform data is to be read from or written into, based only on the allocation of the transmission channels to each device and on the data about the sub-network system which each device belongs to.

Such reading and writing of the waveform data ensures that the waveform data inputted into the audio network system S through each terminal of each device are written in the waveform data regions corresponding to the common transmission channels in the TL frames both in the first and second sub-network systems.

Accordingly, each device can use the waveform data inputted into the audio network system S without concerning about the sub-network system in which the waveform data to be used is first written into the TL frame. However, there is a difference in input timing when the waveform data is written, and this will be described later.

Meanwhile, in the mixer engine E1, the transmission channels in the TL frame from which the waveform data is read and the numbers of the input channel, among the plurality of input channels included in an input channel module 312, into which the read waveform data is to be inputted are respectively set in advance by an input patch 311 shown in FIG. 15.

The mixer engine E1 further equipped with an input module 316 for directly accepting input of the waveform data from the outside without through the TL frame, and the input patch 311 can be also set in such a way that the waveform data inputted through the input module 316 is inputted into an input channel.

The mixer engine E1 then inputs the waveform data read from the positions of the designated transmission channels in the TL frame and the waveform data inputted from the input module 316, into the input channels associated with the transmission channels or the terminals (or ports) of the input module 316 by the input patch 311 according to the setting by the input patch 311. Here, since the waveform data inputted into the first sub-network system S1 has also been written in the TL frame in the second sub-network system S2 by the bridge operation of the third input/output device IO3 as described above, the mixer engine E1 can read the waveform data that has been inputted into the audio network system S from any device, from the TL frame flashing through the mixer engine E1.

Each input channel performs signal processing such as level adjustment, frequency characteristic adjustment, sound image localization position adjustment and the like on the inputted waveform data, and then inputs the resulting waveform data into a mixing bus 313. A plurality of lines are provided in the mixing bus 313, and the output level from each input channel to each line can be arbitrarily set by the user.

The bus in each line mixes the waveform data inputted from the input channels, and inputs the result of the mixing into an output channel of an output channel module 314 that is provided corresponding to the line of the bus. The output channel performs signal processing such as level adjustment, frequency characteristic adjustment and the like on the waveform data outputted from the mixing bus 313.

Further, the numbers of the transmission channels, among the transmission channels allocated to the device in the TL frame, into which the signal processed in each output channel is to be written, are respectively set in advance by an output patch 315. The mixer engine E1 further equipped with an output module 317 for directly outputting the waveform data to the outside without through the TL frame, and the output patch 315 can be also set in such a way that the signals processed in output channels are outputted to the output module 317.

The mixer engine E1 then writes the waveform data processed in each output channel into the region of the transmission channels associated with the output channel in the TL frame in the second sub-network system S2, or outputs the waveform data from the output module 317, according to the setting by the output patch 315. The contents written here are also copied to the TL frame in the other sub-network system by the connecting node as described above.

The waveform data written by the mixer engine E1 is written also into the TL frame circulated in the first sub-network system S1 due to the bridge operation of the third input/output device IO3. Accordingly, each of the first to fourth input/output devices IO1 to IO4 and the console C1 can read the waveform data which has been already processed by the mixer engine E1 from the TL frame flashing through the device and output the read waveform data to the outside, irrespective of whether the device belongs to the first sub-network system or the second sub-network system.

Further, as shown in FIG. 15, in each of the first to fourth input/output devices IO1 to IO4 and the console C1, a patch 303 is set in advance in such a manner that the transmission channels from which the waveform data to be outputted to the outside is read are corresponded to the terminals (or ports) of an output module 304 to be used for the output of the waveform data read from the transmission channels. Each of the first to fourth input/output devices IO1 to IO4 and the console C1 then outputs the waveform data read from each transmission channel in the TL frame from the output module 304 according to the correspondence, thereby output the waveform data, in a desired output channel, which has been processed by the mixer engine E1 from a desired output terminal to the outside (the waveform data may be DA-converted and outputted as analog audio signals, or may be outputted as digital signals).

As described above, even if the transmission routes for the TL frame are separated into the sub-networks in the first sub-network system S1 and the second sub-network system S2, the signal transport across the sub-network systems can be easily performed due to the bridge operation performed by the third input/output device IO3 in the audio network system S as if the transmission routes are connected by the connecting node.

In the case where each sub-network system is formed in the loop style, even when a break of wire occurs at one location in each sub-network system, the signal transport can be continued in the sub-network system in which the break of wire has occurred, as the sub-network system in the cascade style. Accordingly, the tolerance to the break of wire can be enhanced in this case as compared to the case where the whole audio networks system S is formed in one loop.

Besides, since the limit in the length of the transmission route is applied to each sub-network system through which the TL frame is circulated, the connecting cable can be extended to install the devices in a wider range as compared to the case where one TL frame is circulated in the whole audio network system S.

Note that the proper use of the TL frames circulated along the two transmission routes when the sub-network systems are formed in the loop style and the relation between the proper use and the bridge operation have not been described in detail in the explanation so far, and these points are supplemented here.

The case where the TL frames are circulated along the two transmission routes in the sub-network systems respectively includes a case where one of the TL frames is used for transport of the waveform data of the transmission channels corresponding to one TL frame, and a case where both of the TL frames are used for transport of the waveform data regarding the TL frames as including different transmission channels.

Among them, the method in the former case is employed in the above-described embodiment, in which the management data is written into the TL frames circulated along both of the transmission routes, but the Ethernet frame and the waveform data are written into only the TL frame circulated along one of the transmission routes.

This method has the advantage that even if a break of wire occurs at one location in the sub-network system, the sub-network system can be immediately switched to the operation in the cascade style to continue the transport of the waveform data of the same number of channels as before.

Further, since the transmission channels for only one TL frame are prepared in the audio network system S, it is possible to write the waveform data read from the region of a transmission channel in the TL frame in one sub-network system, into the region of the same transmission channel in the TL frame in the other sub-network system irrespective of whether the connection form is the cascade style or the loop style, as long as the transmission channel can be identified. Accordingly, there is no problem in the bridge operation even in the case where the one sub-network system is formed in the cascade style and the other sub-network system is formed in the loop style as well as in the case where the sub-network systems are formed in the same connection style.

3. Timing Adjustment of Wordclock

As has been described, in the audio network system S, the master node has the wordclock supply source, and the wordclock generated by the wordclock supply source defines the transmission timing of the TL frame at least in the first sub-network system S1.

Besides, each of the slave nodes in the first sub-network system S1, including the connecting node, uses the reception timing of the TL frame as a reference, and adjusts the phase of the wordclock based on the data about the time period from when a TL frame is transmitted from the master node till when the TL frame returns to the master node and also on the reception timing of the TL frame once or twice in each node, using the method described, for example, in Japanese Patent Laid-open Publication No. 2008-99264 to thereby obtain a wordclock in the same period as and the matched phase with the wordclock of the master node.

The connecting node works as the sub-network master in the second sub-network system S2, and uses the above-described "wordclock in the same period as and the matched phase with the wordclock of the master node" that the connecting node has generated as the slave node in the first sub-network system S1, as the wordclock defining the timing to transmit the TL frame as the sub-network master. Further, each of the slave nodes in the second sub-network system S2 generates the wordclock in the same period as and the matched phase with the wordclock of the sub-network master, using the reception timing of the TL frame as a reference, as in the first sub-network system.

Therefore, in the audio network system S, all of the nodes can obtain the wordclock in the same period as and the matched phase with the wordclock of the master node. By defining the timings of signal processing and signal input/output based on the wordclock, processes in synchronized timing as the whole system can be performed even when circulation of the TL frame is performed for each sub-network system.

Figure 16:
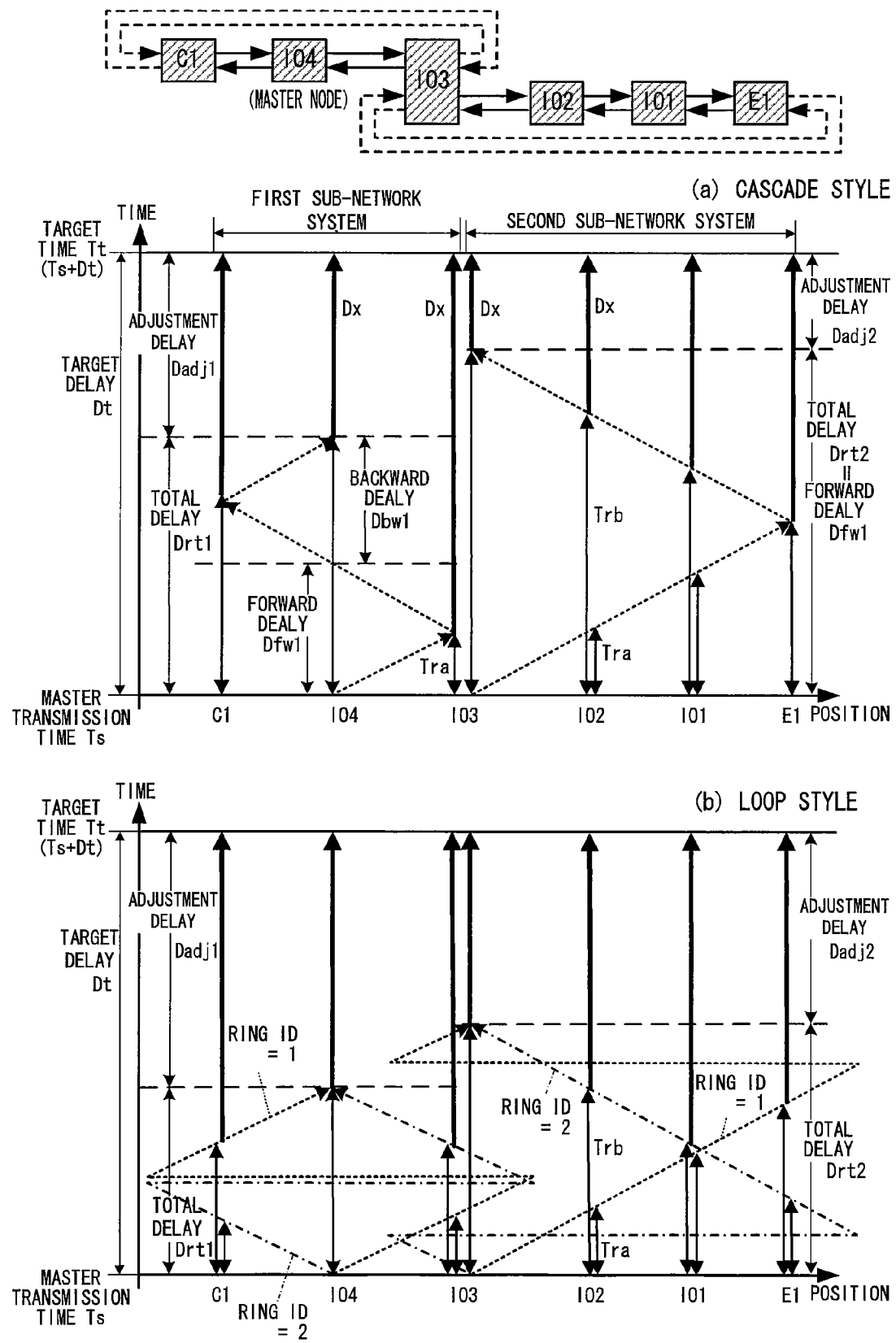
FIG. 16 is a diagram showing the arrival timing of the head of the TL frame at each of the nodes constituting the audio network system.

The arrival timing of the head of the TL frame at each of the nodes constituting the audio network system S is shown in FIG. 16. (a) in FIG. 16 shows an example of the sub-network systems formed in the cascade style, and (b) in FIG. 16 shows an example of the sub-network systems formed in the loop style.

The arrival timings of the TL frame are shown by a broken arrow and a one-dotted chain arrow in the drawing and, in the cascade style, one TL frame passes through each node twice with a time difference therebetween in one sampling period except the nodes at both ends in the cascade as is clear from (a) in FIG. 16. Further, it can be considered that the TL frame also passes through each of the nodes at both ends twice with the time difference therebetween being (almost) zero. The time at which the slave node receives the TL frame for the first time among the two passages shall be a first reception time Tra, and the time at which the slave node receives the TL frame for the second time among the two passages shall be a second reception time Trb. For the nodes at both ends, Tra=Trb.

Each of forward delays Dfw1 and Dfw2 is a time period from when the sub-network master in each sub-network system transmits a TL frame to the forward side (the side to which the TL frame in a certain period is transmitted for the first time; the right side in the drawing) at a master transmission time Ts till when the TL frame returns to the sub-network master for the first time. Each of backward delays Dbw1 and Dbw2 is a time period from when the TL frame has returned to the sub-network master for the first time and the sub-network master then transmits the TL frame to the backward side till when the TL frame returns to the sub-network master for the second time. Accordingly, Dfw1+Dbw1 is a total delay Drt1 that is the time period required for the TL frame to circulate along the transmission route in the first sub-network system. Similarly, Drt2=Dfw2+Dbw2. Note that if the sub-network master is located at an end of the sub-network system, one of Dfwn and Dbwn (n=1, 2) (the delay on the side where no nodes are connected thereto) may be zero.

On the other hand, as is clear from (b) in FIG. 16, two TL frames pass through the respective slave nodes once each in opposite directions, twice in total, in one sampling period in the loop style. The TL frame in which direction passes through the slave node earlier depends on the positional relation between the slave node and the sub-network master. Also in this case, however, the slave node receives the TL frame twice in one sampling period as in the cascade style, and therefore the time at which the slave node receives the TL frame for the first time shall be the first reception time Tra, and the time at which the slave node receives the TL frame for the second time shall be the second reception time Trb.

Further, the time period from when the sub-network master transmits a TL frame till when the TL frame returns to the sub-network master should be the same in both cases of the sub-network master transmitting the TL frame to the forward side and transmitting to the backward side, because the TL frame returns to the sub-network master passing through the communication cable of the same distance and the same number of nodes in both of the cases. Accordingly, assuming that variables regarding the loop style are defined similarly to those regarding the cascade style, Drt1=Dfw1=Dbw1, and Drt2=Dfw2=Dbw2. The ring IDs are IDs given to the two transmission routes formed in one sub-network system respectively.

In the audio network system S, the timing of the wordclock to be used in signal processing is adjusted to a target time Tt by conducting control according to a target delay Dt in all of the nodes assuming that the transport of the TL frame as described above is performed respectively in the cascade style and the loop style in each sub-network system.

Such timing adjustment of the wordclock is performed by the wordclock generator included in the network I/F card 215.

Figure 19:
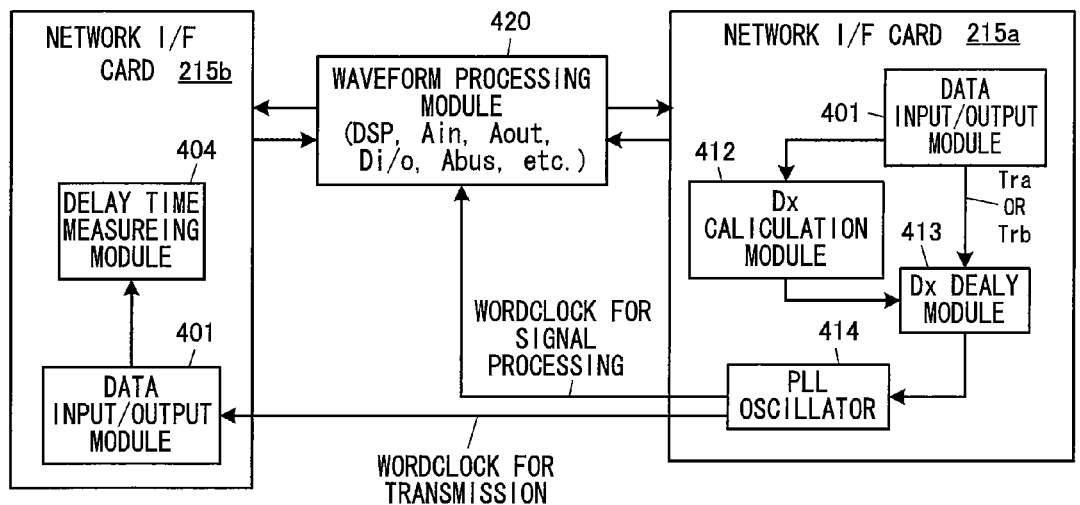
FIG. 19 is a diagram showing the configuration of the wordclock generator in the connecting node that is not the master node.
Figure 20:
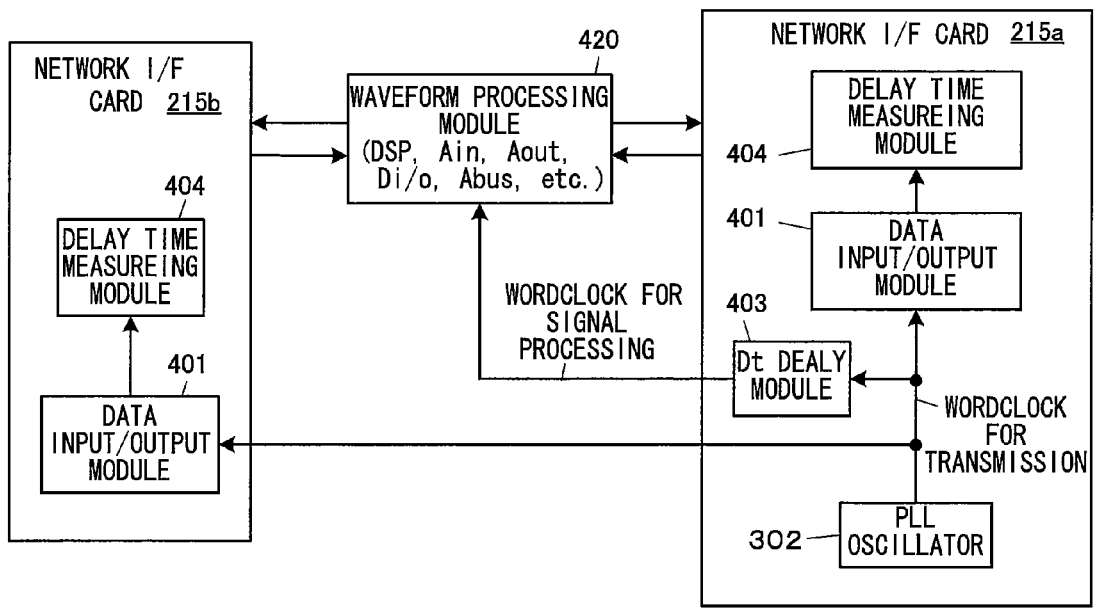
FIG. 20 is a diagram showing the configuration of the wordclock generator in the node that serves both as the master node and the connecting node.

The configurations of the wordclock generator according to the functions of the nodes are shown in FIG. 17 to FIG. 20. FIG. 17 shows the configuration in the master node that is not the connecting node, and FIG. 18 shows the configuration in the slave node that is not the master node and not the connecting node. FIG. 19 shows the configuration in the connecting node that is not the master node, and FIG. 20 shows the configuration in the node that serves both as the master node and the connecting node.

In the master node that is not the connecting node, a PLL (Phase Locked Loop) oscillator 402 shown in FIG. 17 generates a wordclock (WC) for transmission with the same frequency as the sampling frequency (the reciprocal of the sampling period) of the waveform data, and supplies the wordclock for transmission to the data input/output module 401 as a signal indicating the transmission time Ts. The data input/output module 401 collectively shows the first and second data input/output modules 31 and 32 shown in FIG. 8.

A waveform processing module 420 shows the signal processing module in each of other cards connected to the audio bus 217, and the wordclock for signal processing supplied to the waveform processing module 420 is a wordclock common in the cards including the network I/F card 215. The waveform processing module 420 corresponds to a part of the upper layer connected to the upper layer I/F 33 in FIG. 8.

A Dt delay module 403 in the drawing shows here that there is a timing difference corresponding to the target delay Dt shown in FIG. 16 between the wordclock for transmission and the wordclock for signal processing. The target delay Dt is a constant that is previously set by the processing in FIG. 11 and FIG. 12 when the sub-network system in the RTL mode is formed and transmitted from the master node to all of the nodes in the audio network system S. The transmission of the delay amount Dt can be performed with the ITL frame.

When the master node and the connecting node are different devices, the target delay Dt shall be set to the value identical to one period of the wordclock in order to match the phase of the wordclock for signal processing generated by the connecting node with the phase of the wordclock for transmission generated by the master node. When the master node and the connecting node are the same device, the value of Dt may be arbitrarily set without concerning about matching of the phases as long as the value of Dt is larger than the value of Drt.

Generation of the wordclock for transmission by the PLL oscillator 402 can be performed according to the original timing when the network I/F card 215 is a clock master, or in synchronization with the wordclock supplied from another card via the audio bus 217 when the another card is a clock master. However, in both cases, the generation of the wordclock for transmission is performed such that there is a timing difference corresponding to the delay amount Dt between the wordclock for transmission and the wordclock for signal processing. When the delay amount Dt is identical to one period of the wordclock, the phase of the wordclock will not change irrespective of whether the delay is performed or not, so that the delay processing may be omitted.

A delay time measuring module 404 measures the forward delay Dfw1 and the backward delay Dbw1 based on the transmission timing and the reception timing of the TL frame at the data input/output module 401. The data of the forward delay and the backward delay is written in the region of the management data 102 in the TL frame of each sampling period as the reference data that is used for reference of the timing of the wordclock for signal processing, and sent to the other nodes in the sub-network system.

Next, as shown in FIG. 18, in the slave node, a timing signal generated at receiving the TL frame detected by the data input/output module 401 is inputted into a PLL oscillator 414 which stabilizes the period of the timing signal to generate the wordclock for signal processing. In this event, a DX delay module 413 delays the received timing signal by an amount corresponding to the data of the delay time written in the TL frame, whereby the timing to supply the timing signal to the PLL oscillator 414 is set to the target time Tt shown in FIG. 16.

The delay amount Dx in this event can be calculated in a Dx calculation module 412 by measuring the two reception times Tra and Trb while the TL frame in one sampling period circulates along the transmission route(s) and using the values of the reception times Tra and Trb as well as the forward delay Dfwn, the backward delay Dbwn read from the TL frame, the operation state of the sub-network system (whether the cascade style or the loop style) and the target delay Dt previously notified from the master node, for example, by the following expressions (n=1, 2 in both expressions). Note that Tra and Trb indicate two reception times of one TL frame in the cascade style, whereas they indicate one reception time of each of the two TL frames transmitted through different transmission routes in the loop style.

a-1) For the cascade style (the nodes on the forward side of the sub-network master)

$$Dx=Dt-(Dfwn+(Trb-Tra))/2 \ldots \text{Delay from } Trb$$

a-2) For the cascade style (the nodes on the backward side of the sub-network master)

$$Dx=Dt-Dfwn-(Dbwn+(Trb-Tra))/2 \ldots \text{Delay from } Trb$$

b) For the loop style $$Dx=Dt-(Dfwn+(Trb-Tra))/2 \ldots \text{Delay from } Trb$$

Next, as shown in FIG. 19, in the master node that is not the connecting node, the PLL oscillator 414 in a first network I/F card 215a connected to the first sub-network system S1 generates the wordclock for signal processing based on a timing signal generated at receiving the TL frame as in the slave node shown in FIG. 18.

Then, the connecting node supplies the wordclock for signal processing to the data input/output module 401 in a second network I/F card 215b connected to the second sub-network system S2 in which the connecting node is the sub-network master, as a signal indicating the transmission time Ts. This corresponds to the case where a card other than the network I/F card is the clock master in the master node shown in FIG. 17.

When the delay amount Dt here has a value identical to one period of the wordclock, the wordclock for signal processing generated by the PLL oscillator 414 has the same phase as that of the wordclock for transmission generated by the master node. Accordingly, the connecting node can transmit the TL frame in the second sub-network system S2 at the same timing as that when the master node transmits the TL frame in the first sub-network system.

Next, in the node that serves both as the master node and the connecting node, the PLL oscillator 402 in one of the network I/F cards (the first network I/F card 215a in the drawing) generates the wordclock for transmission and supplies the wordclock for transmission as a signal indicating the transmission time Ts to the data input/output module 301 in the network I/F card as in the master node shown in FIG. 17.

Concurrently, the PLL oscillator 402 supplies the wordclock for transmission as the signal indicating the transmission time Ts also to the data input/output module 401 in the other network I/F card (the second network I/F card 215b in the drawing). This also corresponds to the case where a card other than the network I/F card transmitting the TL frame is the clock master in the master node shown in FIG. 17.

When the connecting node is the master node, the connecting node can transmit the TL frame also in the second sub-network system S2 at the same timing as that when the connecting node transmits the TL frame in the first sub-network system S1 even without timing adjustment.

4. Timing Adjustment of Waveform Data Sample

In the audio network system S, the transport of the waveform data across the sub-network systems requires a certain time period because of the above-described bridge operation by the connecting node.

For example, it takes a certain time period from when the waveform data (assumed to be W4) inputted at a certain point in time from the fourth input/output device IO4 into the audio network system S is written into the TL frame in the first sub-network system S1 till when the waveform data is written into the TL frame in the second sub-network system S2. The certain time period is the time period from when the waveform data is written into the TL frame in the first sub-network system S1 and transmitted from the fourth input/output device IO4 to the third input/output device IO3 and read once there till when the waveform data is written into the TL frame in the second sub-network system S2.

Meanwhile, the waveform data (assumed to be W1) inputted from the first input/output device IO1 into the audio network system S at the same point in time is written into the TL frame in the second sub-network system S2 without such time lag.

Accordingly, even if there is no difference, between the first input/output device and the fourth input/output device, in the time period from when an audio signals are inputted to the devices till when the waveform data is written into the TL frame, there is a time lag corresponding to the above-described "the certain time period" between the timings when W1 and W4 are written into the TL frame circulated in the second sub-network system S2. Accordingly, W4 will be written into the TL frame circulated in a sampling period later by some sampling periods (assumed to be X sampling periods) than the sampling period of the TL frame into which W1 is written.

More specifically, based on the TL frame in which W1 is written in a certain sampling period, the waveform data inputted to the fourth input/output device IO4 at a timing earlier by X sampling periods than the certain sampling period should be written in the transmission channel corresponding to W4.

This also applies to the relation between other devices. Consequently, based on the waveform data written in the waveform region in the TL frame circulated in a sub-network system at a certain point in time, the waveform data of the device that does not belong to the sub-network system (the waveform data written by the connecting node) is the waveform data in the sampling period earlier by X sampling periods than the waveform data of the device that belongs to the sub-network system (the waveform data written by the device).

Such timing lag, when left uncontrolled, possibly causes beat due to phase shift or the like at the signal processing, leading to deteriorated quality of audio signals. The audio network system S is composed of the first sub-network system S1 and the second sub-network system S2 which operate as one system as a whole, and therefore it is not preferable to leave such timing lag as it is. Accordingly, such timing lag is corrected when each device, particularly, the device performing signal processing reads the waveform data from the TL frame.

Specifically, it is only necessary for a certain device to delay the waveform data, which has been read from a TL fame, of a device belonging to the sub-network system which the certain device belongs to (the waveform data which has been read from the transmission channels allocated to the device) for a longer time than the waveform data of a device belonging to the sub-network system that is different from the sub-network system which the certain device belongs to, by the timing lag, for example, the X sampling periods, and then provides the delayed waveform data to subsequent signal processing No measures taken in the audio network system S leads to time lag of the waveform data caused based on whether a reading device reads waveform data written by the device downstream in the transmission route for the TL frame from the reading device (when the TL frame into which the device has written the waveform data flashes through the sub-network master by the time when the TL frame arrives at the reading device) or waveform data written by the device upstream from the reading device (when the TL frame into which the device has written the waveform data does not flash through the sub-network master by the time when the TL frame arrives at the reading device) in each sub-network system as described in Japanese Patent Laid-open Publication No. 2008-99264. Hence, it is preferable to determine the delay amount in consideration of the upstream/downstream positional relation and correct also the lag in the above-described adjustment of the delay amount of the waveform data.

In this event, it should be cared that at the time when the connecting node reads the waveform data from the TL frame for the bridge operation, the waveform data in a different sampling period has been written in the TL frame depending on the upstream/downstream positional relation between the device which has written the waveform data and the connecting node. However, the connecting node corrects the delay amount when supplying the waveform data read from the TL frame, to the upper layer I/F 33 for bridge, whereby the time lag generated in the sub-network system of the bridge source can be corrected at the stage when the waveform data is written into the TL frame in the sub-network system of the bridge destination.

Considering the above, it is only necessary to determine the delay amount of the waveform data read from the TL frame at each device when the waveform data is outputted, according to the following four cases depending on the path through which the waveform data is transferred to the reading device.

Note that the following numbers are merely examples in the case where the delay occurring when a new TL frame is generated from the TL frame received at the sub-network master is two sampling periods, and the delay occurring during the bridge operation at the connecting node is six sampling periods (four sampling periods for the correction of the periodic lag generated in the sub-network system of the bridge source plus two sampling periods for the transfer between the network I/F cards 215 by the audio bus 218).

The delay amount for the correction of the time lag during the bridge at the connecting node is as follows.

(i) In the case of receiving the waveform data from an upstream device in the same sub-network system as that of the network I/F card 215 which reads the waveform data,
  →4 sampling periods.

(ii) In the case of receiving the waveform data from a downstream device in the same sub-network system as that of the network I/F card 215 which reads the waveform data,
  →2 sampling periods (delayed by 2 sampling periods during the transfer as compared to (i)).

The delay amount for correcting the time lag of the waveform data read from the TL frame at each device is as follows.

(1) When receiving the waveform data from an upstream device in the same sub-network system,
  →10 sampling periods.

(2) When receiving the waveform data from a downstream device in the same sub-network system,
  →8 sampling periods (delayed by 2 sampling periods during the transfer as compared to (1)).

(3) When receiving the waveform data from a device in a different sub-network system, the connecting node being located upstream of the reading device in the sub-network system which the reading device belongs to,
  →4 sampling periods (delayed by 6 sampling periods during the transfer as compared to (1)).

(4) When receiving the waveform data from a device in a different sub-network system, the connecting node being located downstream of the reading device in the sub-network system which the reading device belongs to,
  →2 sampling periods (delayed by 6+2=8 sampling periods during the transfer as compared to (1)).

In the case where the connecting node reads the waveform data which the connecting node has written into the TL frame by the operation other than the bridge operation (the waveform data supplied from the input port or the output channel of the connecting node), the connecting node can write the waveform data into the TL frames in both sub-network systems without through the bridge operation, so that the nodes in either sub-network system can handle the connecting node as "the device belonging to the same sub-network system."

Also when the connecting node uses the waveform data read from the TL frames for the operation other than the bridge operation (when the connecting node supplies the read waveform data to the output port or the input channel of the connecting node), the connecting node performs the delays similar to the delays in the above-described examples of (1) to (4). In this event, the waveform data with different delay amounts may be supplied to the upper layer I/F 33 between the waveform data for bridge and that for output.

Figure 21:
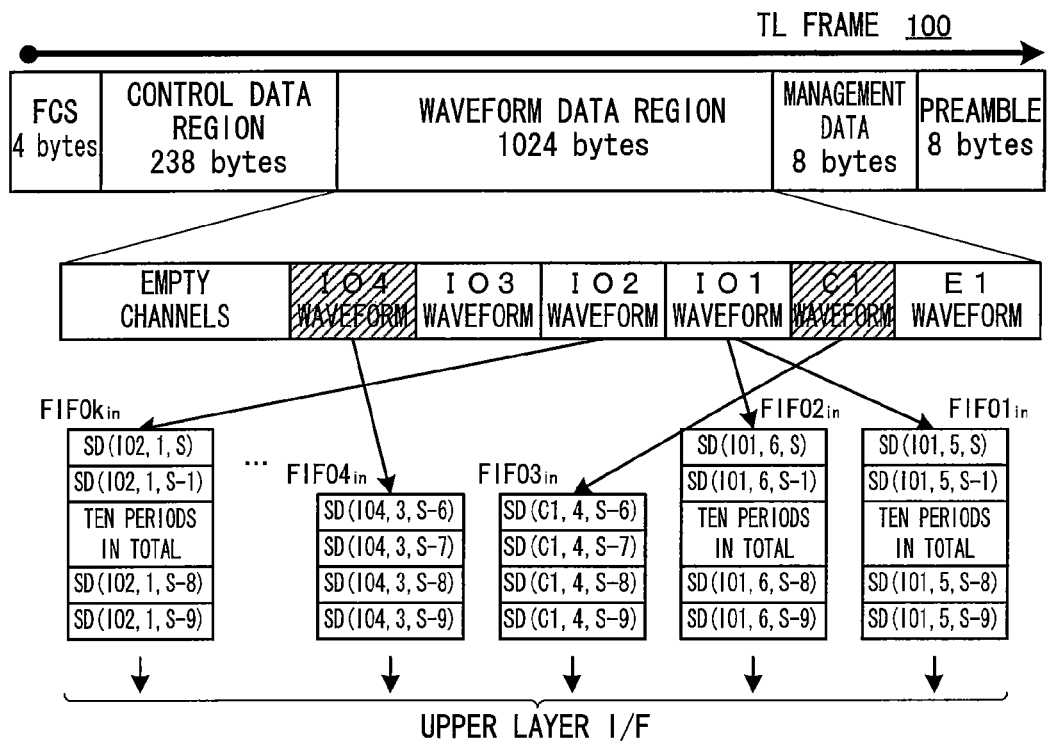
FIG. 21 is an illustration showing an example of timing adjustment performed when the waveform data is read from the TL frame in a mixer engine E1.
Figure 22:
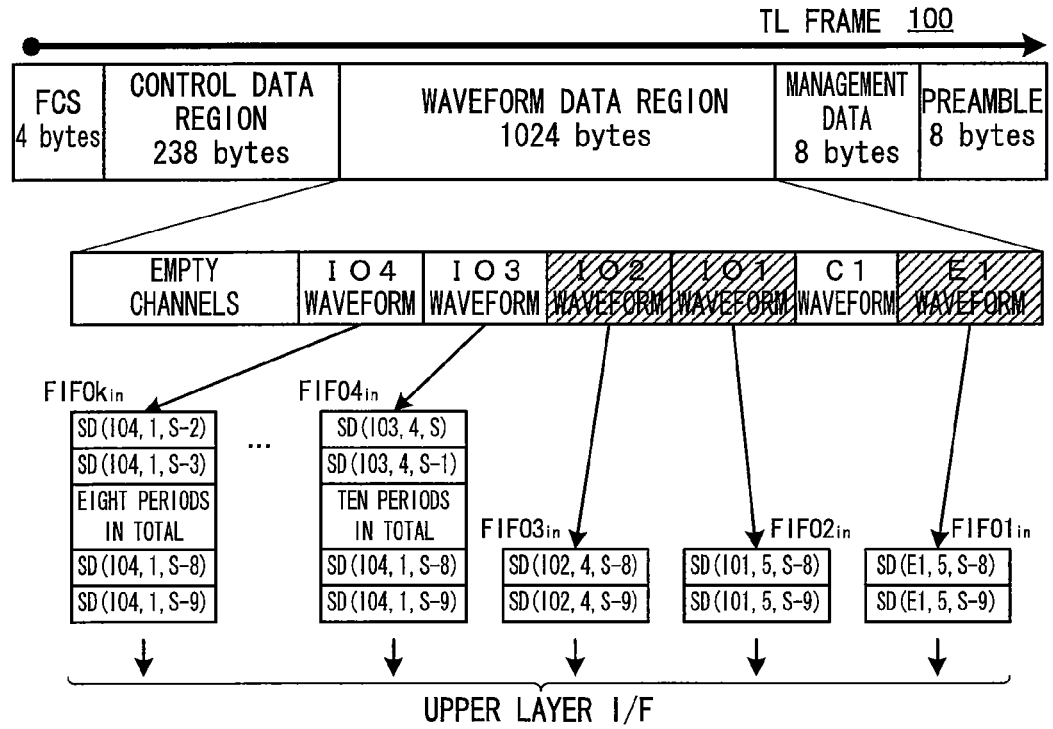
FIG. 22 is an illustration showing an example of timing adjustment performed when the waveform data is read from the TL frame in a console C1.

FIG. 21 and FIG. 22 show examples of timing adjustment performed when the waveform data is read from the TL frame in the mixer engine E1 and the console C1 in consideration of the delays.

These drawings show the examples in which the setting of the delay amount is performed assuming that the waveform data is read from the TL frame circulated clockwise in each sub-network system in loop style shown in FIG. 10, according to the above-described examples of (1) to (4).

In these drawings, regions, in the waveform data region in the TL frame 100, corresponding to the transmission channels allocated to the devices are indicated by signs of the devices. Among them, the regions corresponding to the devices belonging to the sub-network system different from the sub-network system which the target device belongs to are hatched for indicating that the devices belong to the different sub-network systems.

The mixer engine E1 and the console C1 each read the waveform data of the transmission channels to be used for the signal processing in the devices among the waveform data written in the TL frame, and supply the read waveform data to the upper layer I/F 33. Hence, an FIFO memory (FIFO$1_{in}$ to $k_{in}$, k may be different for each device) is provided for each of the transmission channels, and the waveform data read from the TL frame is written into the FIFO memories. In FIG. 21 and FIG. 22, "SD" in each FIFO indicates the waveform data of one sample, and three values in parentheses are values indicating, in order from the head, the node which has written the data into the TL frame, as what number of data the node has written the data, and the number of period of the data. Further, the data written on the upper side is the data which has been written later into the FIFO memory.

As shown in the drawings, the data which has been read from the same TL frame and is to be written into the FIFO memories include data at different time such as the S-th period, the (S−2)-th period, the (S−6)-th period, and the (S−8)-th period depending on the transmission route from the writing device to the reading device.

The mixer engine E1 and the console C1 can grasp one of the examples (1) to (4) which the transmission route from each writing device corresponds to, referring to the topology table showing the connection order of nodes, sent from the master node when transmission of the TL frame in the RTL mode is started and thereafter when a device is added to or removed from the audio network system.

Hence, the mixer engine E1 and the console C1 delay, when supplying the data written in the FIFO memories to the upper layer I/F 33, the data by the delay amount determined according to the above-described example (1) to (4) depending on the transmission route. This makes it possible to supply the waveform data with the matched period irrespective of the originating node, to the upper layer I/F 33 at the timing of the wordclock of the reading device.

5. Modifications

The explanation of the embodiment comes to an end, and it is of course that the configuration of the devices, the configuration of data, the employed communication protocol, the sampling period, concrete process steps, and so on are not limited to those in the above-described embodiment.

Although the explanation has been made such that the master node and the slave node are different in function in the above-described embodiment, each device cannot recognize which device becomes the master node until the designation of the master node is made when the audio network system or the sub-network system is actually formed. Hence, it is conceivable that each device is configured to selectively function as the maser node and as the slave node so that each device can activate an appropriate function depending on whether or not the device decides that the device itself functions as the master node. As a matter of course, there may be a device that functions only as the slave node and cannot be designated as the master node.

Though the master node allocates transmission channels (management of transport bandwidth) in the above-described embodiment, the master node does not always need to perform the allocation. The authority to manage the transport bandwidth may be separated from the master node and provided to a device other than the master node so that the device having the authority manages the transport bandwidth, or the authority to manage the transport bandwidth may be selectively provided to one of a plurality of devices so that the plurality of devices allocate, in turns, transmission channels.

The connecting node requires a plurality of network I/F cards and therefore is different from other nodes in requirements on hardware. However, it is conceivable that a network I/F card is added to an appropriate device in the system so that the device is changed to function as the connecting node as long as the device has the specification capable of ejecting and inserting the card from/to the device during power ON.

It is also not essential to form the I/F for connecting to the audio network system and the DSP for signal processing in a card form to make them attachable and detachable to/from the main body of the audio signal processor 10.

Further, in the case where the sub-network system is formed in cascade style, it is not necessary that the connecting node is located at the end of the cascade.

Though the example in which two sub-network systems are connected to each other has been described in the above-described embodiment, the audio network system may be formed by connecting three or more sub-network systems in a similar manner.

The above-described modifications and the modifications described in the explanation of the embodiment are applicable in any combination in a range without contradiction. Inversely, it is not always necessary for the network system and the audio signal device to have all of the features which have been described in the explanation of the embodiment.

As is clear from the above description, the network system of the invention makes it possible to realize the network system capable of transmitting the audio signals with good reliability among many devices arranged in a wide area.

Accordingly, application of the invention can improve convenience of the network system.

What is claimed is:

1. A network system comprising a first network system and a second network system connected by a connecting node which belongs to both of said first and second network systems, each of said first and second network systems being a sub-network system in which a plurality of nodes and the connecting node are connected to one another to form a cascade or a loop and form a ring transmission route running through all of said plurality of nodes, wherein a frame including regions of a plurality of transmission channels is circulated along said ring transmission route, and each node transmits audio data and control data to other nodes in the sub-network system by writing the audio data and control data into the frame or receives audio data and control data from other nodes in the sub-network system by reading the audio data and control data from the frame, wherein:

a first node in said first network system, other than said connecting node, works as a master node, which periodically generates and sends a first frame to said ring transmission route in said first network system, said connecting node periodically generates and sends a second frame to said ring transmission route in said second network system with a same period as receiving said first frame generated by said first node, a second node in said network system exclusively allocates, to said nodes in said network system, one or more transmission channels among the plurality of transmission channels, the allocation being commonly used in both of said first frame and said second frame, each node in said first network system and each node in said second network system respectively writes audio data to be sent to another node into each of the regions, in the frame received by the node, of the transmission channels allocated to the node, and said connecting node, based on the allocation of the transmission channel by said second node, a) reads audio data from respective regions, in said first frame, of the transmission channels allocated to any node in said first network system and writes the read audio data into the corresponding regions, in said second frame of the same transmission channels, and b) reads audio data from respective regions, in said second frame, of the transmission channels allocated to any node in said second network system and writes the read audio data into the corresponding regions, in said first frame, of the same transmission channels.

2. The network system according to claim 1, wherein each node in one of said first network system and said second network system delays, among audio data which the node reads from the frame received by the node, first audio data which is written into the frame of the one of said first network system and said second network system by a node in the one of said first network system and said second network system for a longer time than second audio data which is written into the frame of the other of said first network system and said second network system by a node in the other of said first network system and said second network system and read from the frame of the other of said first network system and said second network system by said connecting node and written into the frame of the one of said first network system and said second network system by said connecting node, by a time required for said connecting node to bridge the second audio data from the frame of the other of said first network system and said second network system to the frame of the one of said first network system and said second network system.

3. A network system comprising a first network system and a second network system connected by a connecting node which belongs to both of said first and second network systems, each of said first and second network systems being a sub-network system in which a plurality of nodes and the connecting node are connected one another to form a cascade or a loop and form a ring transmission route running through all of said plurality of nodes, wherein a frame including regions of a plurality of transmission channels is circulated along said ring transmission route, and each node transmits audio data and control data to other nodes in the sub-network system by writing the audio data and control data into the frame or receives audio data and control data from other nodes in the sub-network system by reading the audio data and control data from the frame, wherein:

said connecting node works as a master node, which periodically generates and sends a first frame to said ring transmission route in said first network system, and generates and sends a second frame to said ring transmission route in said second network system with a same period as sending said first frame, one node in said network system exclusively allocates, to said nodes in said network system, one or more transmission channels among the plurality of transmission channels, the allocation being commonly used in both of said first frame and said second frame, each node in said first network system and each node in said second network system respectively writes audio data to be sent to another node into each of the regions, in the frame received by the node, of the transmission channels allocated to the node, and said connecting node, based on the allocation of the transmission channel by one node, a) reads audio data from respective regions, in said first frame, of the transmission channels allocated to any node in said first network system and writes the read audio data into the corresponding regions, in said second frame of the same transmission channels, and b) reads audio data from respective regions, in said second frame, of the transmission channels allocated to any node in said second network system and writes the read audio data into the corresponding regions, in said first frame, of the same transmission channels.

4. The network system according to claim 3, wherein each node in one of said first network system and said second network system delays, among audio data which the node reads from the frame received by the node, first audio data which is written into the frame of the one of said first network system and said second network system by a node in the one of said first network system and said second network system for a longer time than second audio data which is written into the frame of the other of said first network system and said second network system by a node in the other of said first network system and said second network system and read from the frame of the other of said first network system and said second network system by said connecting node and written into the frame of the one of said first network system and said second network system by said connecting node, by a time required for said connecting node to bridge the second audio data from the frame of the other of said first network system and said second network system to the frame of the one of said first network system and said second network system.

5. A method for communication in a network system, said network system comprising a first network system and a second network system connected by a connecting node which belongs to both of said first and second network systems, each of said first and second network systems being a sub-network system in which a plurality of nodes and the connecting node are connected to one another to form a cascade or a loop and form a ring transmission route running through all of said plurality of nodes, wherein a frame including regions of a plurality of transmission channels is circulated along said ring transmission route, and each node transmits audio data and control data to other nodes in the sub-network system by writing the audio data and control data into the frame or receives audio data and control data from other nodes in the sub-network system by reading the audio data and control data from the frame, said method comprising:

periodically generating and sending, by a first node in said first network system, a first frame to said ring transmission route in said first network system, wherein said first node, other than said connecting node, works as a master node;

periodically generating and sending, by said connecting node, a second frame to said ring transmission route in said second network system with a same period as receiving said first frame generated by said first node;

exclusively allocating, by a second node in said network system, to said nodes in said network system, one or more transmission channels among the plurality of transmission channels, the allocation being commonly used in both of said first frame and said second frame;

writing, respectively by each node in said first network system and each node in said second network, audio data to be sent to another node into each of the regions, in the frame received by the node, of the transmission channels allocated to the node; and performing, by said connecting node, based on the allocation of the transmission channel by said second node, a) reading audio data from respective regions, in said first frame, of the transmission channels allocated to any node in said first network system and writing the read audio data into the corresponding regions, in said second frame of the same transmission channels, and b) reading audio data from respective regions, in said second frame, of the transmission channels allocated to any node in said second network system and writing the read audio data into the corresponding regions, in said first frame, of the same transmission channels.

6. A method for communication in a network system, said network system comprising a first network system and a second network system connected by a connecting node which belongs to both of said first and second network systems, each of said first and second network systems being a sub-network system in which a plurality of nodes and the connecting node are connected to one another to form a cascade or a loop and form a ring transmission route running through all of said plurality of nodes, wherein a frame including regions of a plurality of transmission channels is circulated along said ring transmission route, and each node transmits audio data and control data to other nodes in the sub-network system by writing the audio data and control data into the frame or receives audio data and control data from other nodes in the sub-network system by reading the audio data and control data from the frame, said method comprising:

periodically generating and sending, by said connecting node, a first frame to said ring transmission route in said first network system, wherein said connecting node works as a master node;

periodically generating and sending, by said connecting node, a second frame to said ring transmission route in said second network system with a same period as sending said first frame;

exclusively allocating, by one node in said network system, to said nodes in said network system, one or more transmission channels among the plurality of transmission channels, the allocation being commonly used in both of said first frame and said second frame;

writing, respectively by each node in said first network system and each node in said second network, audio data to be sent to another node into each of the regions, in the frame received by the node, of the transmission channels allocated to the node; and performing, by said connecting node, based on the allocation of the transmission channel by one node, a) reading audio data from respective regions, in said first frame, of the transmission channels allocated to any node in said first network system and writing the read audio data into the corresponding regions, in said second frame of the same transmission channels, and b) reading audio data from respective regions, in said second frame, of the transmission channels allocated to any node in said second network system and writing the read audio data into the corresponding regions, in said first frame, of the same transmission channels.

7. A connecting device that connects a first network system and a second network system to form a network system and belongs to both of said first and second network systems, each of said first and second network systems being a sub-network system in which a plurality of nodes and the connecting device are connected to one another to form a cascade or a loop and form a ring transmission route running through all of said plurality of nodes, wherein a frame including regions of a plurality of transmission channels is circulated along said ring transmission route, and each node transmits audio data and control data to other nodes in the sub-network system by writing the audio data and control data into the frame or receives audio data and control data from other nodes in the sub-network system by reading the audio data and control data from the frame, the connecting device comprising:

a transmitter configured for periodically sending a second frame to said ring transmission route in said second network system with a same period as receiving a first frame periodically generated by a first node in said first network system other than said communication device, said second frame periodically generated, wherein said connecting device, based on an allocation of the plurality of transmission channels by a second node in said network system, the allocation being commonly used in both of said first frame and said second frame, a) reads audio data from respective regions, in said first frame, of the transmission channels allocated to any node in said first network system and writes the read audio data into the corresponding regions, in said second frame of the same transmission channels, and b) reads audio data from respective regions, in said second frame, of the transmission channels allocated to any node in said second network system and writes the read audio data into the corresponding regions, in said first frame, of the same transmission channels.

8. A connecting device that connects a first network system and a second network system to form a network system and belongs to both of said first and second network systems, each of said first and second network systems being a sub-network system in which a plurality of nodes and the connecting device are connected to one another to form a cascade or a loop and form a ring transmission route running through all of said plurality of nodes, wherein a frame including regions of a plurality of transmission channels is circulated along said ring transmission route, and each node transmits audio data and control data to other nodes in the sub-network system by writing the audio data and control data into the frame or receives audio data and control data from other nodes in the sub-network system by reading the audio data and control data from the frame, the connecting device comprising:

a first transmitter configured for periodically sending a first frame to said ring transmission route in said first network system, said first frame periodically generated, and a second transmitter configured for periodically sending a second frame to said ring transmission route in said second network system with a same period as said first transmitter sending said first frame, said second frame periodically generated, wherein said connecting device, based on an allocation of the transmission channels by one node in said network system, the allocation being commonly used in both of said first frame and said second frame, a) reads audio data from respective regions, in said first frame, of the transmission channels allocated to any node in said first network system and writes the read audio data into the corresponding regions, in said second frame of the same transmission channels, and b) reads audio data from respective regions, in said second frame, of the transmission channels allocated to any node in said second network system and writes the read audio data into the corresponding regions, in said first frame, of the same transmission channels.

* * * * *